(12) United States Patent
Stankowski

(10) Patent No.: US 6,635,175 B2
(45) Date of Patent: Oct. 21, 2003

(54) FILTER HOUSING

(75) Inventor: Ralph J. Stankowski, Westford, MA (US)

(73) Assignee: Mykrolis Corporation, Billerica, MA (US)

(*) Notice: Subject to any disclaimer, the term of this patent is extended or adjusted under 35 U.S.C. 154(b) by 0 days.

(21) Appl. No.: 09/894,442

(22) Filed: Jun. 28, 2001

(65) Prior Publication Data

US 2001/0037969 A1 Nov. 8, 2001

Related U.S. Application Data

(63) Continuation-in-part of application No. 09/418,978, filed on Oct. 14, 1999, now abandoned.

(51) Int. Cl.$^7$ .................... B01D 27/08; B01D 35/30
(52) U.S. Cl. ................ 210/232; 210/444; 210/450
(58) Field of Search .................. 210/232, 444, 210/450

(56) References Cited

U.S. PATENT DOCUMENTS

| | | |
|---|---|---|
| 4,028,254 A | 6/1977 | Shufflebarger et al. |
| 4,172,798 A | 10/1979 | Kronsbein |
| 4,316,801 A | 2/1982 | Cooper |
| 4,678,576 A | 7/1987 | Leoncavallo |
| 4,735,716 A | 4/1988 | Petrucci et al. |
| 4,876,005 A | 10/1989 | America |
| 5,089,131 A | 2/1992 | Gentry |
| 5,114,572 A | 5/1992 | Hunter et al. |
| 5,133,858 A | 7/1992 | Walz et al. |
| 5,591,329 A | 1/1997 | Davidson |
| 5,595,651 A | 1/1997 | Pavel |
| 5,609,757 A | 3/1997 | Schiavo et al. |

FOREIGN PATENT DOCUMENTS

| | | |
|---|---|---|
| EP | 0 657 201 A1 | 6/1995 |
| SU | 528108 | 10/1976 |
| SU | 583810 | 1/1978 |
| SU | 605626 | 5/1978 |
| SU | 755291 | 8/1980 |

*Primary Examiner*—Thomas M. Lithgow
(74) *Attorney, Agent, or Firm*—Mykrolis Corporation; Timothy J. King; Paul J. Cook

(57) ABSTRACT

A filter cartridge housing formed of a manifold and a bowl containing a filter cartridge is disclosed. The filtration cartridge and bowl are connected to each other to form a unitary construction. The filtration cartridge and bowl are in fluid communication with the manifold in a manner which prevents mixing of a fluid feed to the module and a permeate removed from the module. A threaded ring substantially fixed in a position relative to either the bowl or the manifold is used to positively drive the manifold and bowl together and apart as needed and to form a secure and liquid tight seal between the two components when they are together. The threaded ring is held by a key in the keyway on of the outer surface of the bowl or manifold. The threads of the ring mate with the threads on the manifold or bowl. As the ring is relatively fixed by the key/keyway to its position on the bowl or manifold, it moves the bowl relative to the manifold as the ring is rotated onto or off of the mating threads.

11 Claims, 32 Drawing Sheets

FILTER HOUSING

REFERENCE TO RELATED APPLICATION

This application is a continuation-in-part application of application Ser. No. 09/418,978, filed Oct. 14, 1999 (now abandoned).

BACKGROUND OF THE INVENTION

The present invention relates to a filter housing having a manifold and a bowl with a threaded ring there between to secure the bowl to the manifold. A filter cartridge is fixed to the interior of the bowl and can be removable therefrom. More particularly, it relates to a filter bowl and manifold which has a threaded ring retained in a fixed position relative either to the bowl or manifold and which is used to drive the bowl and manifold together or apart.

There are two basic types of filter housings used today for filter cartridges. The first and most recent is the disposable housing. Typically formed of plastic, it has a filter cartridge sealed inside. Once it has been used the entire device, housing, filter and all are simply thrown away. The second and more common type is the disposable filter cartridge in a reusable housing.

Although many different designs have been developed for a filtration module used in an ultrapure liquid filtration with a reusable housing, two designs are prevalent. In one module design, liquid to be filtered flows from one end of the filtration module to the other hand. In this class of the filtration modules, the feed and permeate connections are located at opposite ends of the filter thereby forcing the liquid flow to move from one end to the other. This flow configuration is referred to as an in line flow configuration. These filtration modules suffer from two disadvantages. First, they are more difficult to connect to the process equipment since the module is sandwiched between two sets of connections. Second, any free liquid remaining within the module quickly drains upon disconnection of the module because at least one connection is positioned at the bottom of the module.

A second filtration modular design locates all of the connections at the same end of the module. In this type of module, the feed and permeate ports are typically horizontally oriented at the top or "head" end of the module on opposite sides thereof. Due to their shape, these modules are referred to as having a T, L or U configuration. This configuration facilitates connection of the head to the remaining portion of the filtration module comprising the bowl and the filtration cartridge positioned within the bowl. In this design, the bowl and filtration cartridge comprise separate elements. Thus, when constructing the filtration module, the filtration cartridge and the bowl are separately secured to and sealed to the manifold head. In addition, upon completion of filtration the bowl and cartridge are separately removed from the head. This separate removal requires that the bowl be moved a distance substantially greater than the entire length of the cartridge in order to expose the cartridge to permit its removal. Thereafter, the exposed cartridge is removed by hand or with a hand tool. Since the filter cartridge is saturated with the liquid being filtered which is often times corrosive or toxic, the cartridge removal step presents a danger to the worker. In addition, since the bowl must be moved the length of the cartridge, the space within which the bowl and cartridge are positioned must accommodate this removal step.

In either of these embodiments, the bowl is removably attached to the manifold via a threaded ring that mates with threads on the manifold. The bowl and manifold are simply held together by the threaded ring. One or more filter cartridges are secured inside the bowl. To replace a filter cartridge, one simply removes unscrews the ring, pulls the bowl from the manifold, removes the cartridge, replaces it with a new cartridge reattaches the bowl to the manifold and then secures the threaded ring in place to maintain the connection between the two components.

This design presents several problems. First, the connection between the manifold and the bowl must be liquid tight. This typically accomplished with a series of O-rings between the manifold and bowl and/or the cartridge and the manifold. While forming a secure seal, during use the seal becomes somewhat fixed (or stuck together) and difficult to break when one tries to replace the spent filter.

Secondly, most of these systems hang vertically downward and require two hands to remove and reattach the bowl to the manifold Even when the bowl and manifold separate easily, the bowl is not supported by anything, meaning that the bowl can easily drop either breaking the bowl or spilling its contents, which in many cases especially in the semiconductor industry is a hazardous material.

It has been proposed in U.S. Pat. No. 5,114,572 to provide a filter assembly which cooperates with a bowl to produce a filter cartridge-bowl construction which can be demounted as a single unit from a manifold. The filter cartridge is connected to the bowl by bayonet connections on the cartridge which fit into grooves within the interior surface of the bowl. This bayonet connection requires the flanges extending from the outside surface of the filter cartridge be positioned into grooves that extend vertically within the bowl and then into grooves which extend horizontally within the bowl. The connection configuration requires that the cartridge first be moved vertically into the vertical grooves and then be rotated into the horizontal grooves when mounting the cartridge into the bowl. Conversely, when it is desired to remove the cartridge from the bowl upon completion of a filtration process, the cartridge must be rotated and lifted from the bowl in a single motion. Since removal of the cartridge from the bowl requires application of force on the fluid conduit located at the top of the cartridge, and since the diameter of this conduit is smaller than the cartridge diameter there is no leverage of the application force on the cartridge. This, in turn, requires application of considerable force on the cartridge when effecting its removal from the bowl that may require the use of hand held tool. The application of a rotational force and a lifting force as a single motion increases the difficulty of separating the bowl from the filter cartridge. In addition, bowl rotation can dislodge the cartridge utilizing a bayonet connection. Separation of the cartridge from the bowl is particularly difficult when toxic or corrosive fluids have been filtered by this filtration device.

Further, current designs have the cartridge seal against and be lightly (friction fit) held to the manifold. Any application of back pressure when applied to the cartridge can cause the cartridge to unseat from the manifold, rendering it ineffective for filtration.

Accordingly, it would be desirable to provide a filtration module construction which avoids the need to remove the filtration cartridge separately than the bowl from the manifold while permitting the filter cartridge and bowl to be removed from a manifold as a single unit. In addition, it would be desirable to provide such a construction that avoids the need for applying force in a plurality of directions of movement to effect removal of a cartridge and bowl from a manifold. Such a construction would promote ease of separating the cartridge and bowl from the manifold, would eliminate the danger to the worker in removing the filtration cartridge subsequent to filtration and would reduce the space required to install the filtration module. Lastly, by forming the cartridge and the bowl as a unitary structure and securing that structure to the manifold, the problem of the cartridge becoming dislodged from the manifold when subjected to back pressure is avoided.

SUMMARY OF THE INVENTION

A filter cartridge housing formed of a manifold and a bowl is disclosed. A threaded ring substantially fixed in a position relative to either the bowl or the manifold is used to positively drive the manifold and bowl together and apart as needed and to form a secure and liquid tight seal between the two components when they are together. The threads of the ring mate with corresponding threads on component that does not contain the ring. The threaded ring is held in its substantially fixed position relative to the one component by a device which allows for the free rotational movement of the ring relative to the component to which it is mounted but which restricts its vertical movement relative to that component. One such device is a key on the ring that fits in the keyway on of the outer surface of the component. The threads of the ring mate with the threads on the other component. As the ring is relatively fixed by the key/keyway to its position on the first component, it moves that component in a vertical direction relative to the other component as the ring is rotated onto or off of the mating threads of the second component. Alternatively, other retention devices such as a ridge may be used in lieu of the key/keyway design In accordance with this invention, a filtration module is provided comprising a manifold, and the combination of a filtration cartridge and bowl wherein the filtration cartridge and bowl are either formed of one piece or wherein they can be locked together to be installed and removed as one piece from the manifold. When the filter cartridge and bowl are formed from separate pieces, they are joined together by application of a force in a single direction at a given time such as force in a single direction at a given time such as a force in a vertical direction. The bowl and filter cartridge are joined together by a snap fit wherein mating elements on the bowl and filter cartridge are shaped so the elements are held together by friction which requires a force to decouple the bowl and filter cartridge. This construction permits the decoupling of the filtration cartridge and bowl from the manifold in one step. In one embodiment, the means for a coupling the filtration cartridge and bowl to the manifold prior to use and during use. In addition, the coupling means can be constructed so that when it is desired to remove the filtration cartridge and bowl from the manifold, the filtration cartridge and bowl can be removed as one piece of manifold.

It is an object of the present invention to provide a filter housing comprising a bowl containing a fixed filter cartridge, a manifold and a threaded ring retained in a fixed position relative either to the bowl or manifold and which is used to drive the bowl and manifold together or apart. It is another object of the present invention to provide a filter housing comprising a manifold and a bowl containing a fixed filter cartridge, the manifold having a series of threads formed on its outer surface, the bowl having a ring with threads on its inner surface which mate with the threads of the manifold, the ring being secured to the bowl so as to maintain a relatively fixed position on the vertical axis of the ring.

It is a further object of the present invention to provide a filter housing comprising a manifold and a bowl containing a fixed filter cartridge, the bowl having a series of threads formed on its outer surface, the manifold having a ring with threads on its inner surface which mate with the threads of the bowl, the ring being secured to the manifold so as to maintain a relatively fixed position on the vertical axis of the manifold.

It is another object of the present invention to provide a filter housing comprising a bowl containing a fixed filter cartridge and a manifold, a threaded ring retained in a fixed position relative either to the bowl or manifold and which is used to drive the bowl and manifold together or apart wherein the ring is secured to the bowl via a keyway and a key formed on the inner surface of the ring and mounted within the keyway of the bowl.

It is a further object of the present invention to provide a filter housing comprising a bowl containing a fixed filter cartridge and a manifold, a threaded ring retained in a fixed position relative either to the bowl or manifold and which is used to drive the bowl and manifold together or apart wherein the ring is secured to the manifold via a keyway and a key formed on the inner surface of the ring and mounted within the keyway of the manifold.

It is an additional object of the present invention to provide a filter housing comprising a bowl containing a fixed filter cartridge and a manifold, a threaded ring retained in a fixed position relative either to the bowl or manifold and which is used to drive the bowl and manifold together or apart wherein the ring is secured to either the bowl or manifold via a ridge formed below the ring on the outer surface of the bowl or manifold.

It is another object of the present invention to provide a filter housing comprising a bowl containing a fixed filter cartridge and a manifold, a threaded ring retained in a fixed position relative either to the bowl or manifold and which is used to drive the bowl and manifold together or apart wherein the ring drives the housing and manifold together and apart as it is rotated in the appropriate direction.

BRIEF DESCRIPTION OF THE DRAWINGS

FIG. 10b is an isometric view of a bowl used in conjunction with the cartridge of FIG. 10a.

FIG. 14b is a partial top view of the bowl of FIG. 14a.

FIG. 14c is a cross sectional view of a filter cartridge of this invention being positioned into the bowl of FIG. 14a.

FIG. 14d is a cross sectional view of the filter cartridge of FIG. 14c fully positioned into the bowl of FIG. 14a.

FIG. 16a is a partial isometric view of an inner surface of a bowl into which fits the filter cartridge of FIG. 16a.

FIG. 16b is a partial isometric view of an inner surface of a bowl into which fits the filter cartridge of FIG. 16a.

DETAILED DESCRIPTION OF THE INVENTION

Figure 1:
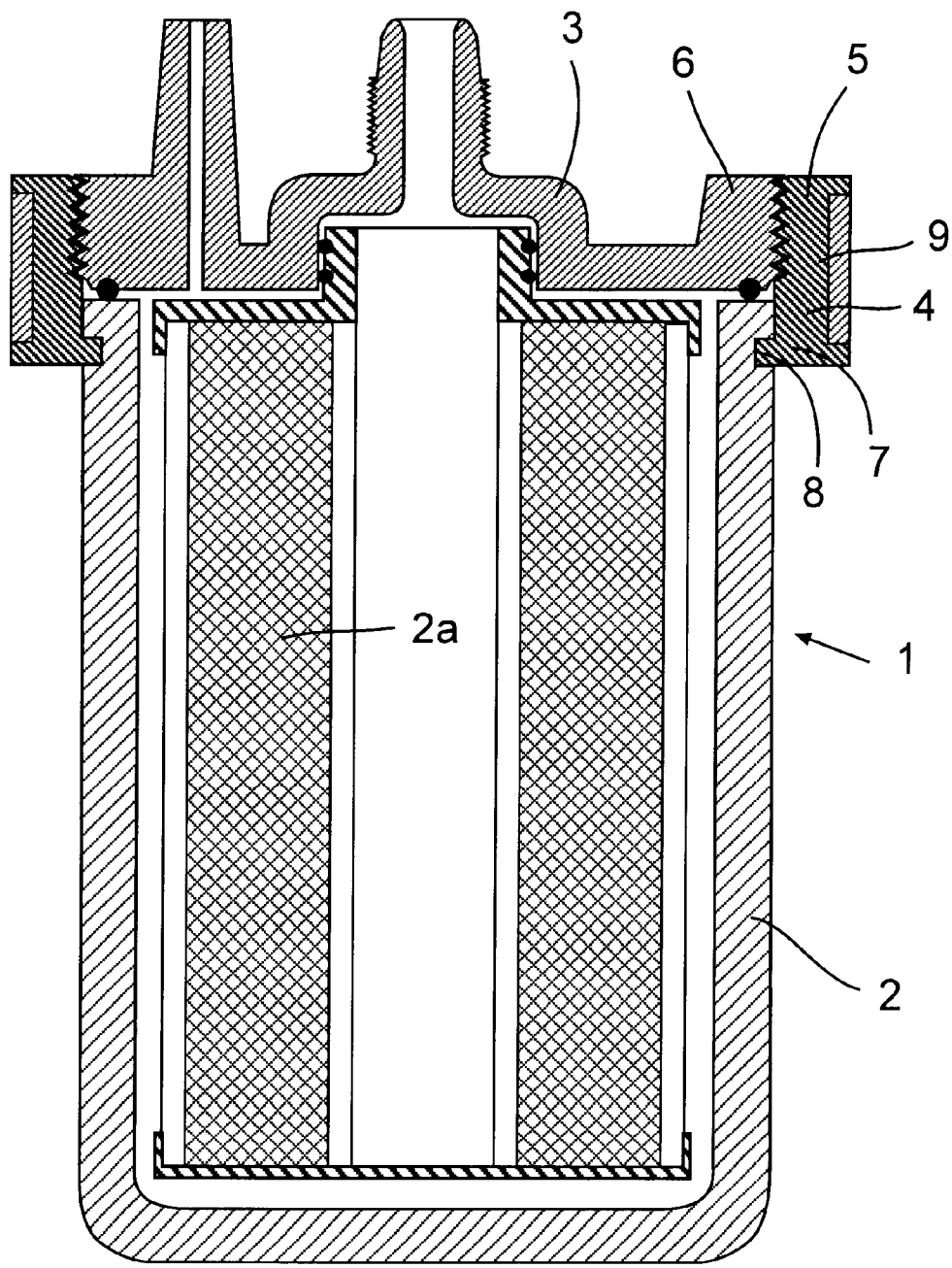
FIG. 1 shows a first embodiment of the present invention in cross section.

In FIG. 1 is shown a first embodiment of the present invention. In this embodiment there is shown a filter housing 1. The housing 1 is of a U line design, although the invention will work equally well with inline and other such housing designs. The housing 1 is formed of a first component 2 and a second component 3. A threaded ring 4 is substantially fixed in its position upon the first component 2. The threads 5 of the ring 4 mate and thread easily with corresponding threads 6 formed on the second component 3.

In this embodiment as shown in the FIG. 1, the first component 2 is a cartridge bowl and the second component 3 is a manifold. The cartridge bowl 2 contains a filter cartridge 2a which is fixed to cartridge bowl 2 in a manner more fully described below. As the ring 4 is substantially fixed in its position relative to the first component in this case the bowl 2, i.e. it cannot move any substantial distance along the length of the bowl 2. When its threads 5 are mated to the corresponding threads 6 on the second component, in this case the manifold, 3 and the threads 5,6 are drawn together, the ring 4 carries or drives the first component or bowl 2 into affirmative contact with the second component or manifold 3. Conversely, when the ring 4 is rotated so as to drive the threads 5,6 apart, the first component or bowl 2 is positively carried or driven away from the second component or manifold 3.

The device used to fix the position of the ring 4 to one of the two components can be a variety of devices. As shown in FIG. 1, the ring 4 is fixed to the first component 2, i.e. the bowl in this embodiment, using a key 7 formed on the ring 4 which key 7 mates and is held within a keyway 8 formed in the bowl 2. The ring 4 is shown with a knurled feature 9 on a portion of its outer side surface. The use of knurling or other such devices for providing an easy, slip-free surface to the ring is well known and may be used in this invention. Additionally, the use of lugs or tapered surfaces on the outer surface of the ring may be used to allow one to attach a wrench or other device for moving the ring relative to the other threaded component. While it is contemplated in the preferred embodiments of this present invention that no wrench or other device is necessary to move the ring, it is still within the scope of the present invention.

Figure 2:
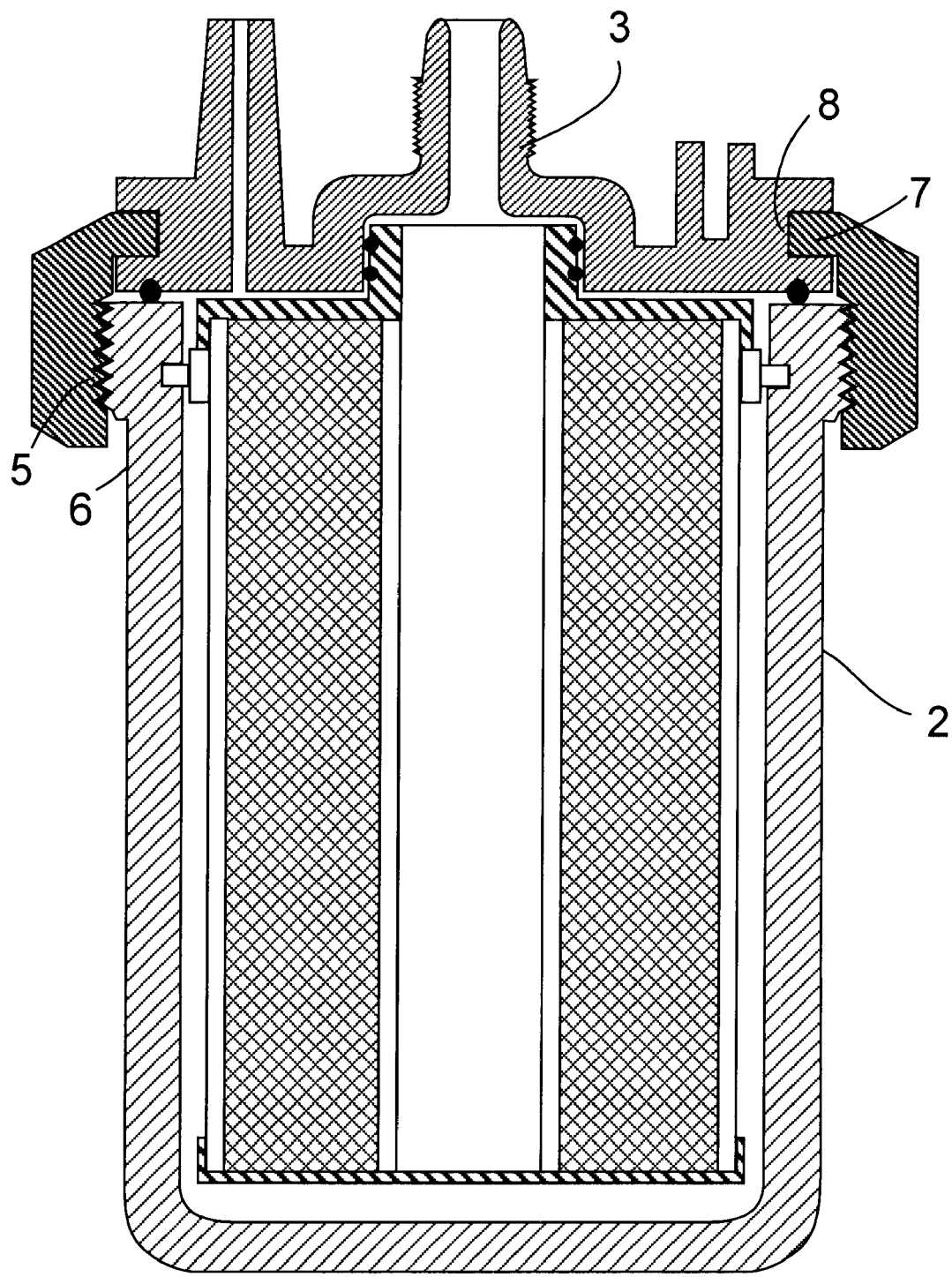
FIG. 2 shows a second embodiment of the present invention in cross section.
Figure 3:
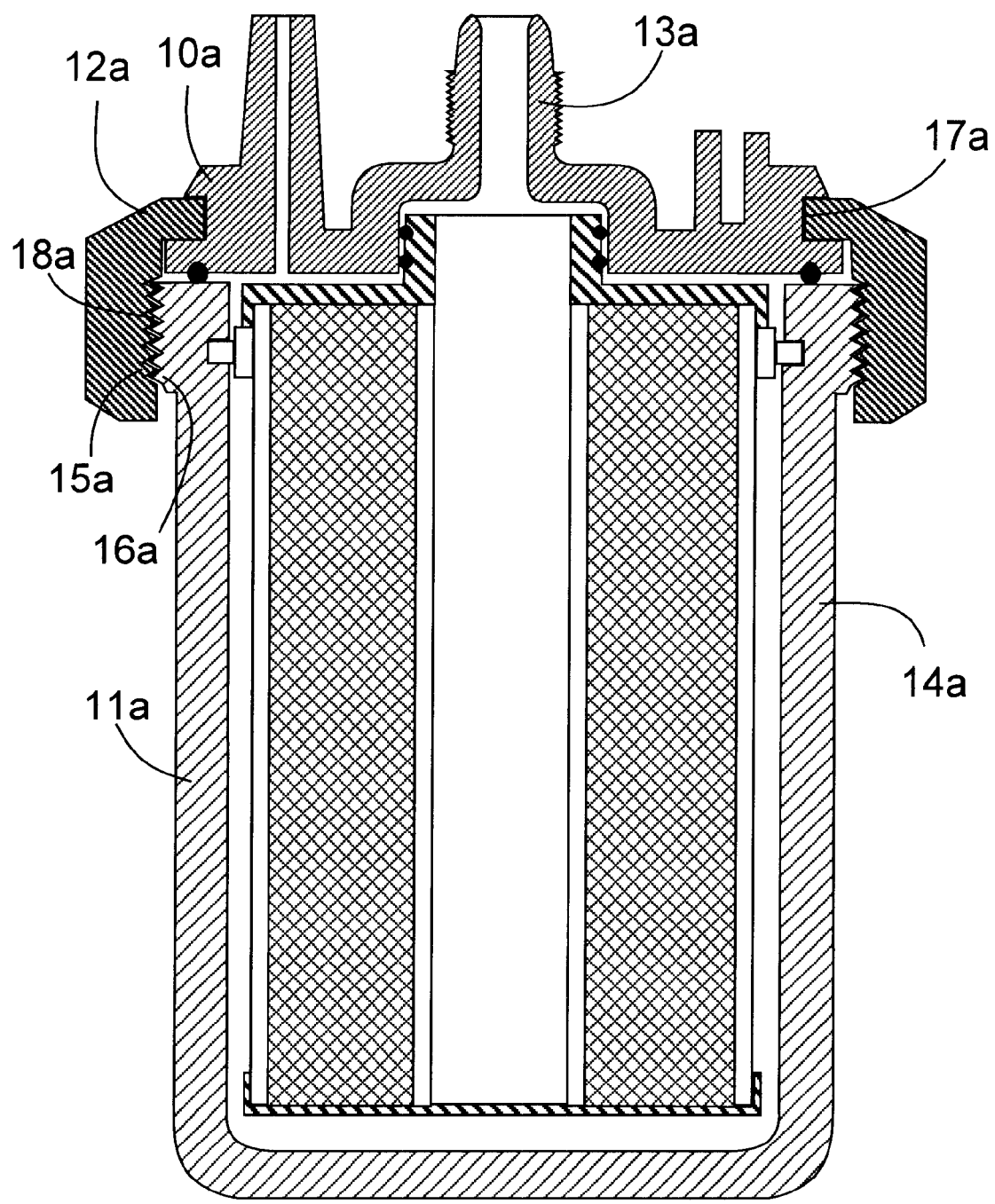
FIG. 3 shows another embodiment of the present invention in cross section.

While the ring 4 is shown as being fixed to the bowl 2 in this embodiment, it may as easily be fixed to the manifold 3 as in FIG. 2 (the same numbers as in FIG. 1 apply where relevant in FIG. 2). Here the ring 4 is attached to the manifold 3 rather than the bowl 2 of FIG. 1. The keyway 8 is formed in the manifold surface and the key 7 of the ring 4 is trapped within it. The threads 5 of the ring 4 mate with the threads 6 of the manifold 3 to drive the manifold 3 and bowl 2 together and apart Alternatively, the ring may be retained to either component by the use of a different type of retention device. In FIG. 3 is shown an embodiment in which one or more ridges 10a, in this case one ramped ridge is formed on the surface 11a of the component to which it is desired to attach the ring 12a.

In this instance, the ring 12a is attached and substantially fixed to the manifold 13a of the housing 14a. The other component of the housing is the bowl 11a. The ring 12a in this instance is made of plastic and is force fit or snap fit over the ridge 10a and thereafter retained in a substantially fixed position relative to the length of the bowl 11a. In this instance, there is also formed a keyway 17a in the manifold to help hold the ring in place. No such keyway is necessary so long as the surface of the component containing the ridge 10a has a portion adjacent its distal end that is of a diameter greater than that of the ridge. For an example of such a feature, see the lip 44a of FIG. 7. As can be seen the diameter of the lip is adjacent a distal end of the component on which the ridge is formed and it has a diameter greater than that of the ridge. The threads 15a of the ring 12a mate with the threads 16a of the bowl 11a and as the ring is rotated they are either driven together or apart (depending on the relative movement of the threads against each other Other embodiments can also be used. For example, the bracket or surface to which the manifold is mounted may have a portion which extends over the ring and thereby traps it to the manifold when the manifold is secured in place. Other such embodiments will be obvious to one of ordinary skill in the art.

Figure 4:
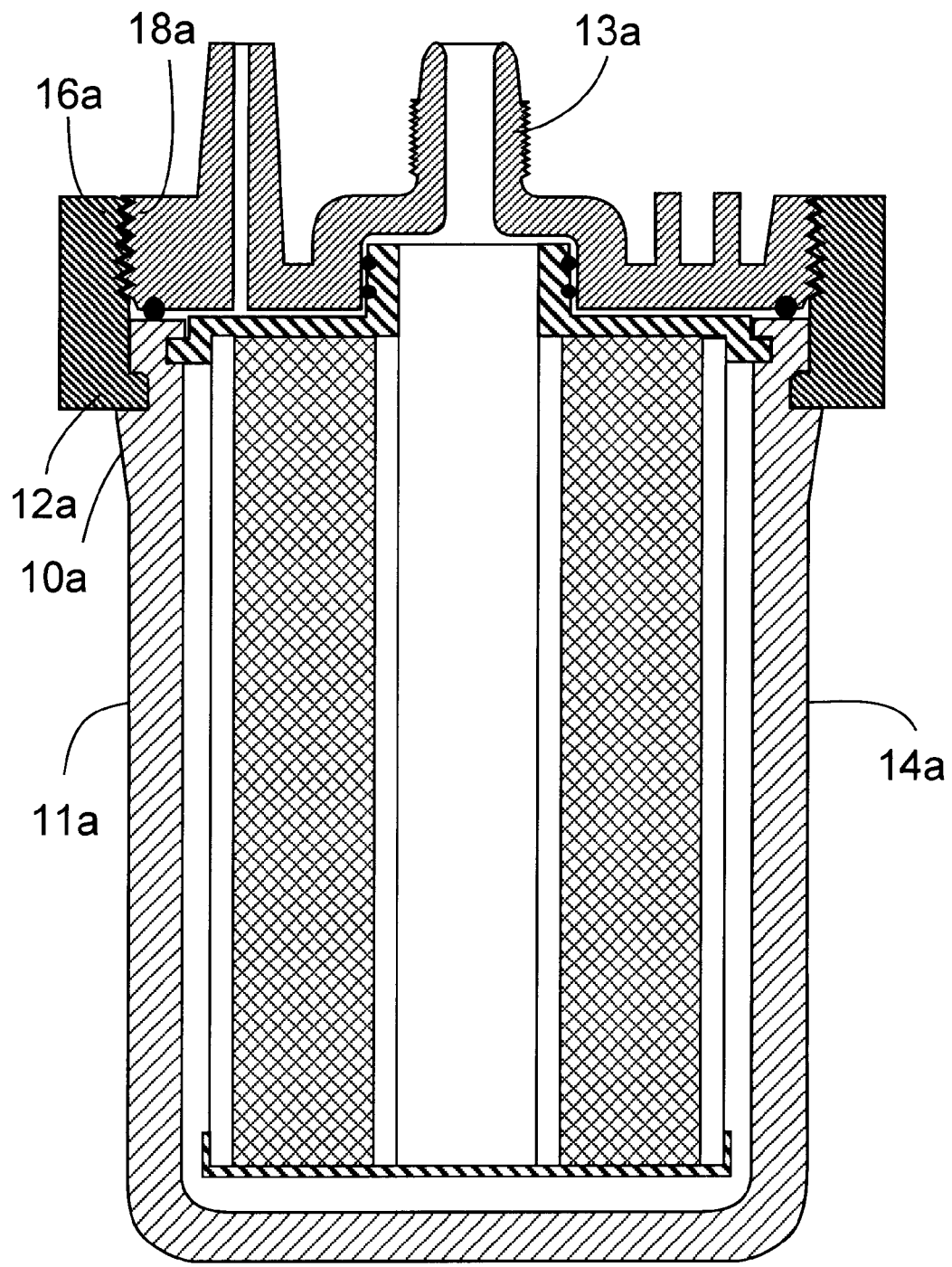
FIG. 4 shows a further embodiment of the present invention in cross section.
Figure 5:
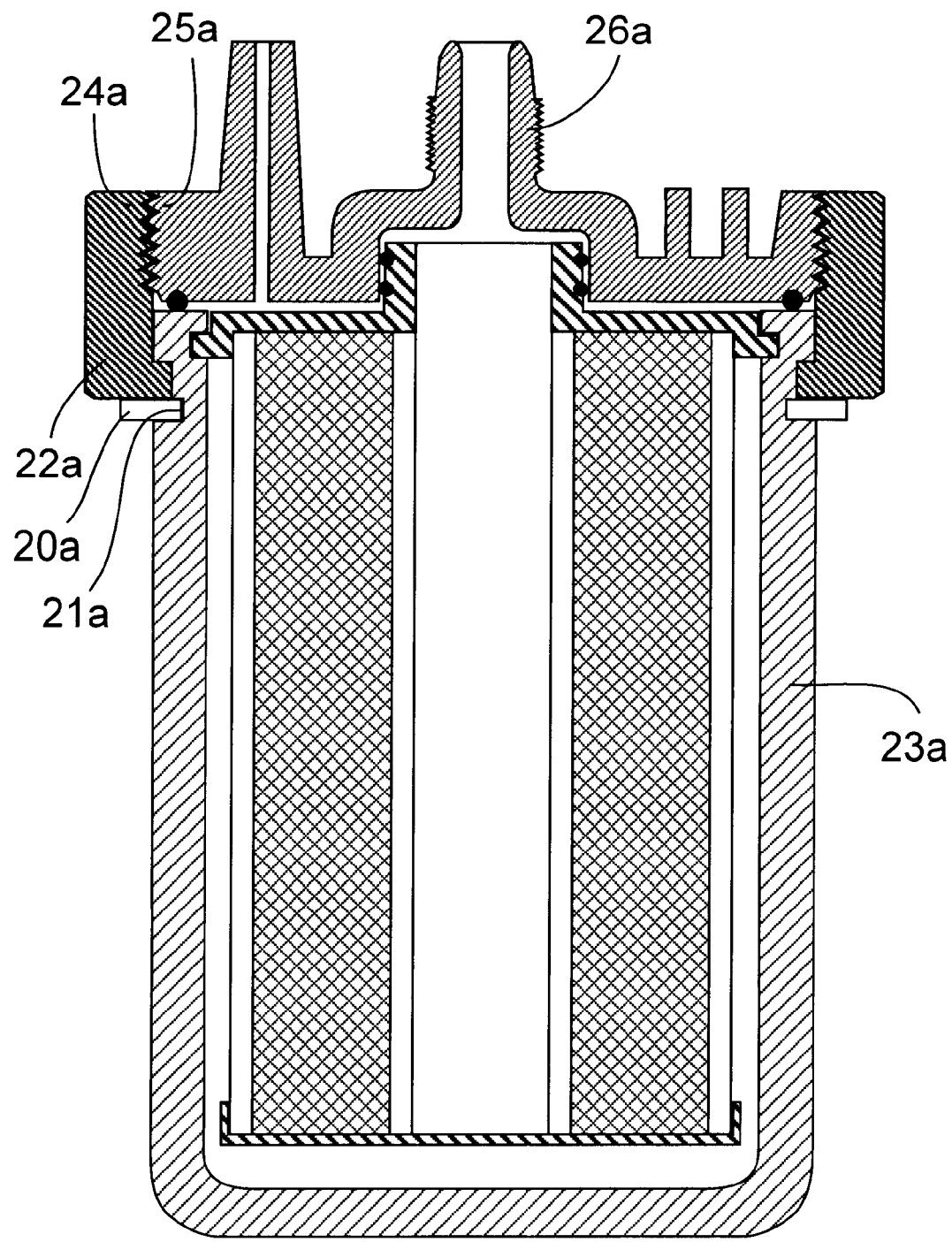
FIG. 5 shows a fifth embodiment of the present invention in cross section.

In FIG. 4 is shown an embodiment where the ridge 10a, again in this example as shown a ramped ridge, is formed on the bowl 11a rather than the manifold 13a. The ridge or ridges maintain the position of the ring 12a relative to the bowl 11a and the threads 15a of the ring 12a mate with the threads 18a of the manifold 13a to drive the bowl 11a and manifold 13a relative to one another In FIG. 5 is shown an embodiment where a snap ring 20a is retained within a raceway 21a for the snap ring 20a and thereby fixes the threaded ring 22a to the desired component, in this embodiment the bowl 23a. The threads 24a of the ring 22a mate with the threads 25a of the manifold 26a.

Figure 6:
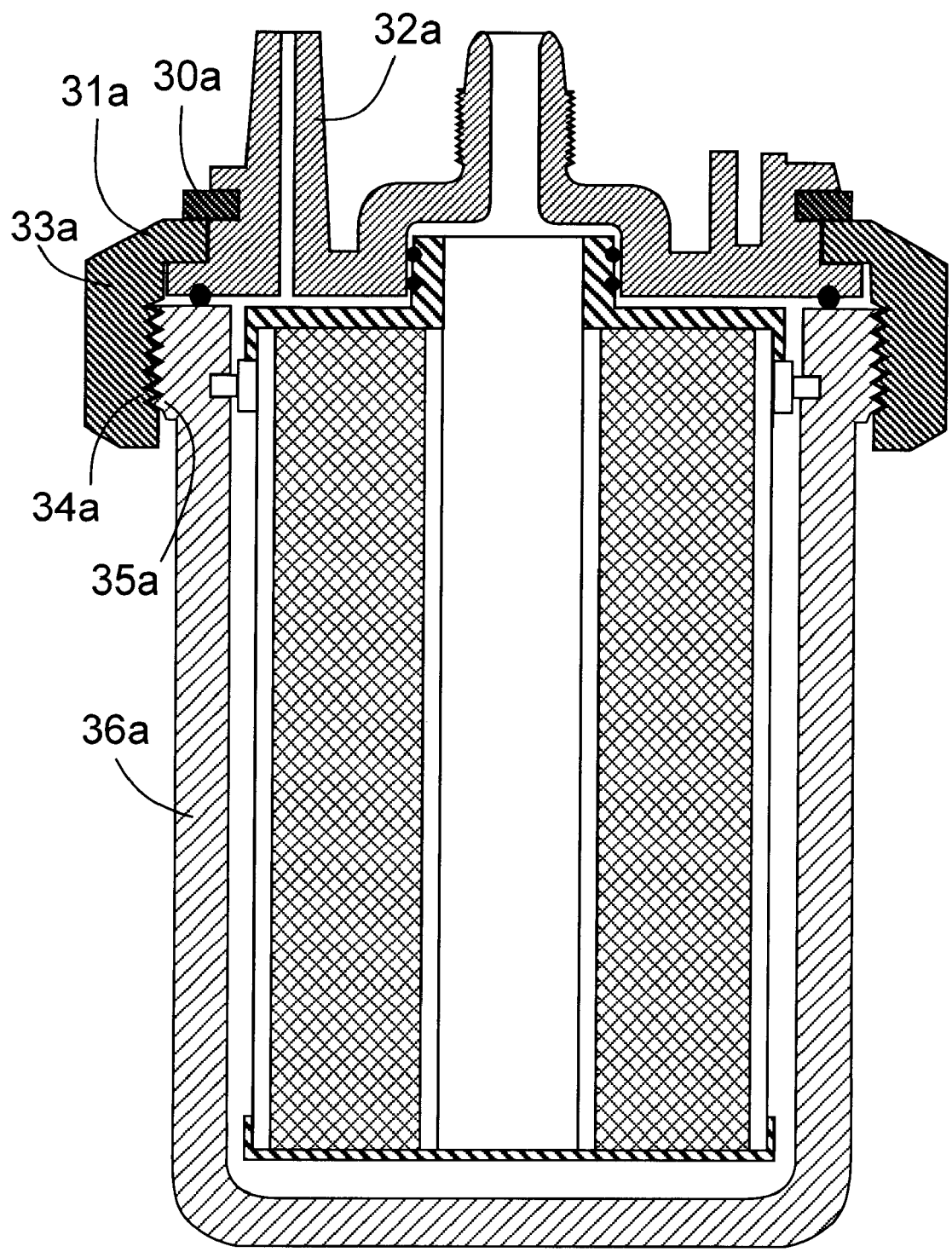
FIG. 6 shows another embodiment of the present invention in cross section.

In FIG. 6 is shown the use of a snap ring 30a within a raceway 31a mounted on the manifold 32a to retain the threaded ring 33a. The threads 34a of the ring 33a mate with threads 35a of the bowl 36a which is driven toward and away from the manifold depending upon the direction of rotation of the threaded ring 33a.

Figure 7:
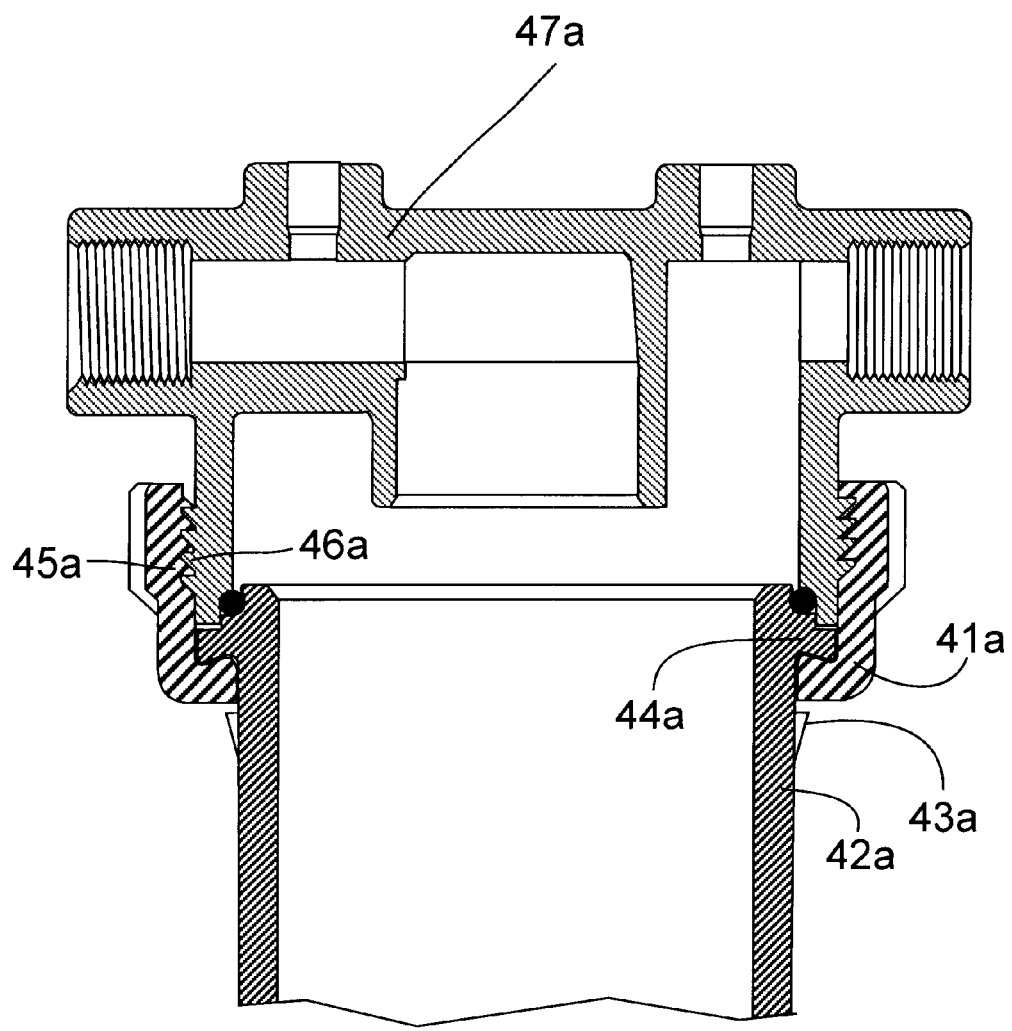
FIG. 7 shows a further embodiment of the present invention in cross section

FIG. 7 shows a further embodiment of the present invention and clearly demonstrates what is meant by the term "substantially fixed". In this embodiment, the ring 41a is mounted to the bowl 42a and retained to the bowl 42a by a ridge 43a, which in this embodiment is a circular ring positioned along a portion of the outer surface of the side wall of the bowl 42a. The bowl 42a also has a lip 44a which extends outward from the upper portion of the outside surface of the side wall of the bowl 42a. The threads 45a of the ring 41a mate with the threads 46a of the manifold 47a.

As can be seen, there is substantial room between the lip 44a and the ridge 43a along the length of the side wall of the bowl 42a. Yet, this embodiment still shows the ring 41a being in a substantially fixed position relative to the bowl 42a. By the term "substantially fixed", it is meant that the ring is retained to one component of the housing in such a manner that its travel along the length of the component is less than 50% of that length. Preferably, the amount of travel allowed to the ring relative to the length of the component is less than 25% of the component length.

In other terms, the length of travel of the ring relative to the length of the component should be such that at least for a portion of the rotation of the threads between the ring and the second component, there is a driving force caused by the threads of the ring to move the components affirmatively. Preferably, the length of travel is limited such that the threads of the ring will begin to rotate against those of the other component for some set (as desired by the manufacturer) distance before the ring threads are in a position to positively drive the two components together or apart. In this way, one is staggering the load placed upon the ring making its use easier, quicker and simpler.

Alternatively, one can use other devices should as band clamps, lugs, etc to retain the ring in its desired substantially fixed position relative to the component to which it is mounted. The device used to retain the ring in a substantially fixed position relative to the component to which it is attached is not critical so long as it allows the two components to adequately move relative to each other to form a liquid tight seal and to allow the ring to retained in a manner so that it affirmatively drives the two components at least a portion of the way together and apart as desired.

Preferably the housing of the present invention is used in conjunction with a unitary filter/bowl assembly such as is described in the co-pending U.S. application, Ser. No. 60/103,646 filed Oct. 09, 1998 the teachings of which are incorporated herein in their entireties. In this embodiment the filter cartridge is positively retained within the bowl and travels with it. In one embodiment the bowl and cartridge are formed as an integral disposable unit. In another the cartridge in held to the inner surface of the bowl through the use of a twist or bayonet type flange on the cartridge which rotates in a slot formed on the inner side wall of the bowl. The use of other attachment devices such as lugs or pins which slide and are retained within slots formed in the inner side wall of the bowl are also described. Regardless of the means used to do so, that device coupled with the present invention provides an extremely valuable device in that it allows one to limit the space below the manifold needed to remove the bowl and cartridge and that allows one to easily attach and detach the bowl from the manifold. In prior device designs, one first needed to remove the bowl from the manifold and then remove the cartridge from the manifold. This meant that one needed to leave space slightly greater than the length of the bowl in order to remove the device and replace the cartridge. This was a waste of valuable space within a filtration device. Additionally, with the use of the substantially fixed position ring of the present invention, one can easily attach and detach the bowl from the manifold and can do so usually with one hand and often without the use of any wrench, which was often required in order to free the bowl from the manifold.

The present invention provides a filtration module formed of a manifold, a filtration cartridge and a bowl. The manifold provides fluid pathways for fluid feed into the filtration cartridge and permeate removal from the filtration cartridge. The bowl provides a means of storing fluid feed to permit its introduction into the filtration cartridge or to store permeate from the filtration cartridge to be directed to the manifold and then from the filtration module. Fluid feed can be introduced into the filtration cartridge through the manifold either from the outside of the filtration cartridge or from within the interior of the filtration cartridge. The fluid in the bowl adjacent the filtration cartridge can be either fluid feed or permeate. In any event, the fluid feed is introduced from a manifold into the filtration module and permeate is removed from the filtration module from the manifold.

The filtration module and bowl are constructed so that they are sealed with the manifold or removed from contact with the manifold as one piece. Thus, the bowl and filtration module can be formed as one piece or can be formed from two pieces which are interlocked together by moving the bowl and filter cartridge in only one direction relative to each other at a given time. After the bowl and filtration module have been connected to the manifold, they are locked together so that, during use in filtering of fluid, they do not become separated.

Subsequent to a filtration, the bowl and filtration module are removed from the manifold as a single piece rather than as two separate pieces. Since the bowl and filtration module are removed together, the filtration module need not be removed form the bowl. Thus, a space substantially equal to the length of the filtration module and the bowl together need not be provided. Only a space as long as substantially the length of the bowl need be provided. This permits one to install a filtration module of this invention within a smaller space as compared to the space required with present filtration modules. In addition, since the filtration module is removed with the bowl, it need not be handled by a worker either by hand or with a hand tool. Furthermore, any fluid positioned between the bowl and the filtration module upon completion of filtration need not be removed. This substantially reduces the possibility of contacting fluid within the bowl with a worker. Alternatively, the bowl could contain a drain for removing fluid before removal.

Figure 8:
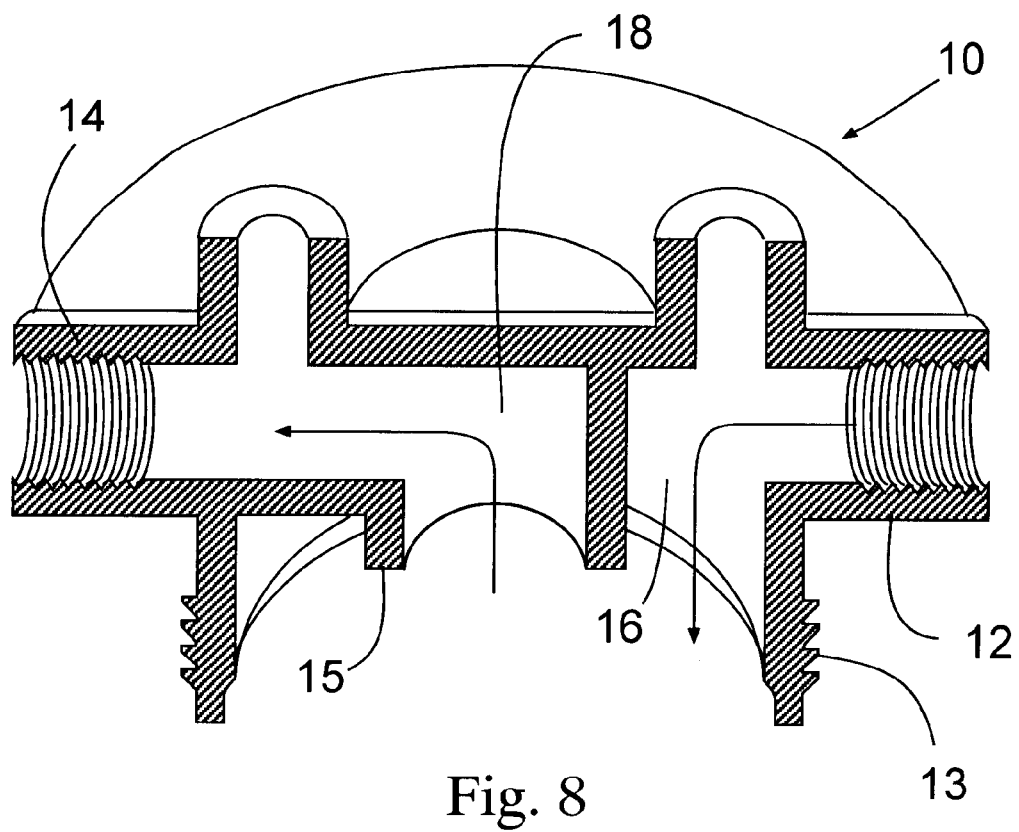
FIG. 8 is a cross sectional view of a manifold useful in that present invention.

Referring to FIG. 8, the manifold 10 includes an inlet 12, external threads 13 for connecting the bowl and an outlet 14. Fluid passageway 16 permits introduction of feed fluid into a bowl (not shown) to the outlet 14.

Figure 9:
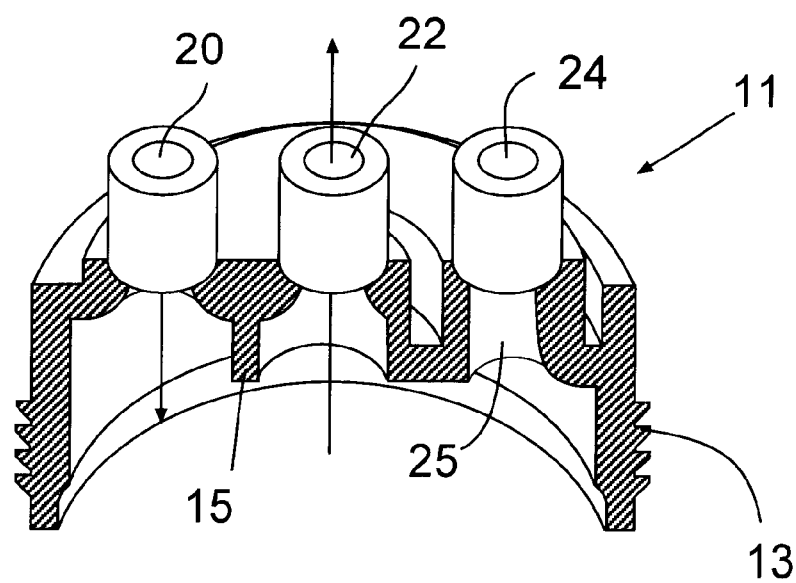
FIG. 9 is a cross sectional view of an alternative manifold use in the present invention.

Referring to FIG. 9, the manifold 11 includes a inlet 20 which is in fluid communication with a bowl (not shown) and a permeate outlet 22 which is in fluid communication with a filtration module (not shown) and a gas vent 24 sealed with hydrophobic membrane 25.

Figure 10A:
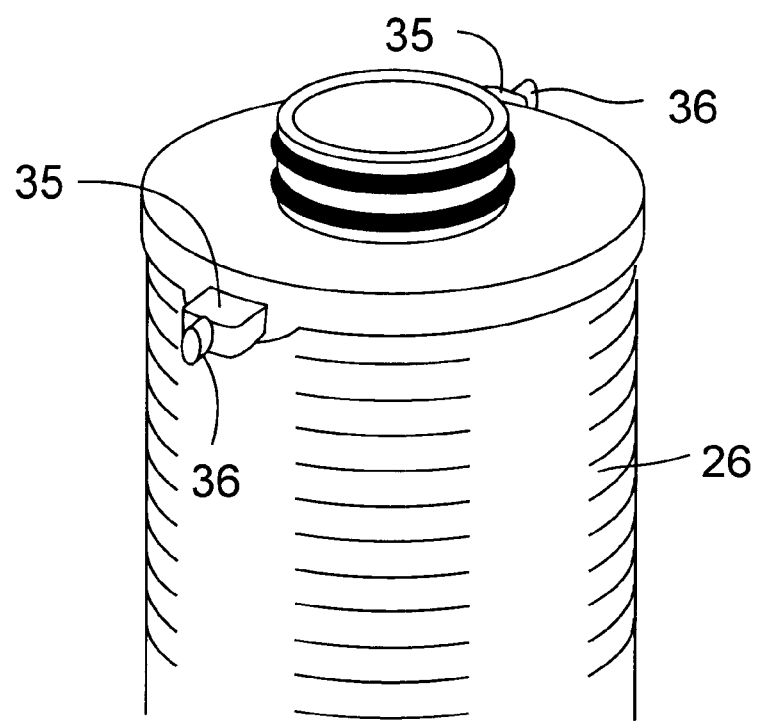
FIG. 10a is an isometric view of a cartridge construction of this invention.
Figure 10B:
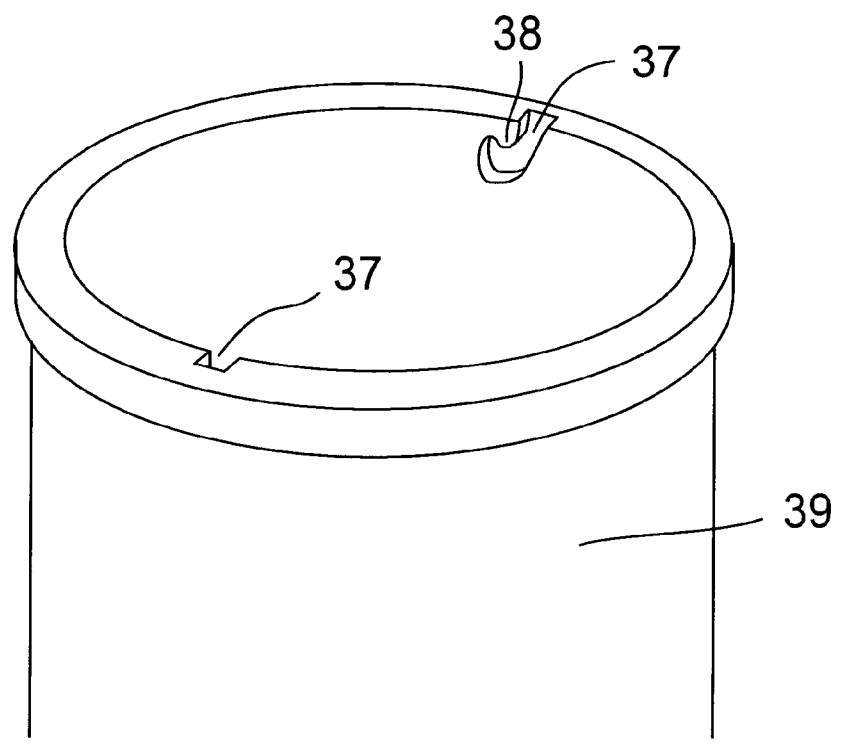
Figure 10C:
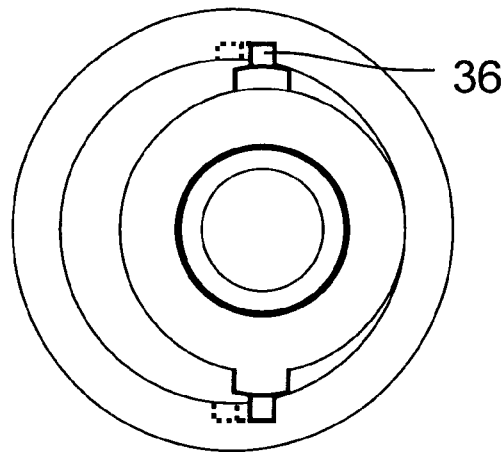
FIG. 10c is a top view illustrating inserting the cartridge of FIG. 3a into the bowl of FIG. 10b.
Figure 10D:
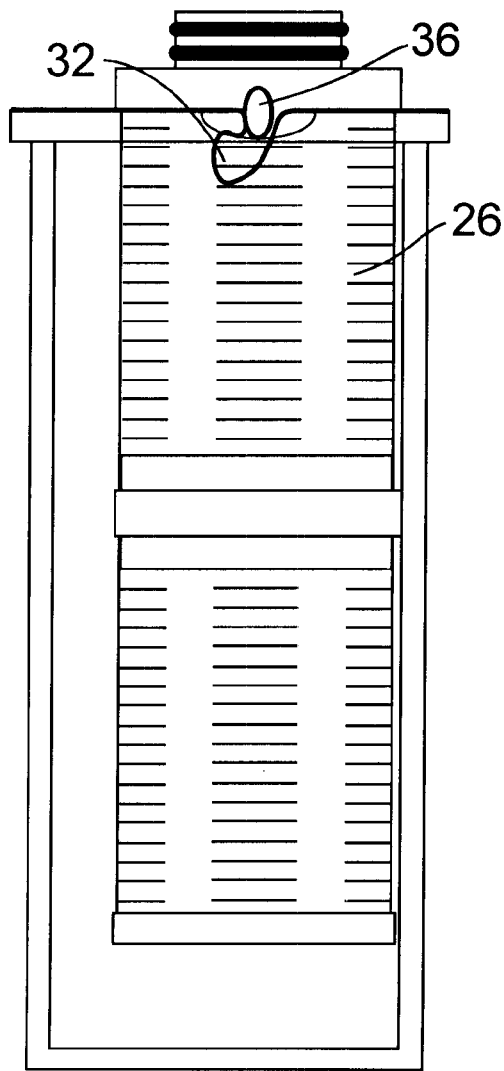
FIG. 10d is a side cross sectional view of the bowl and cartridge of FIG. 10c.
Figure 10E:
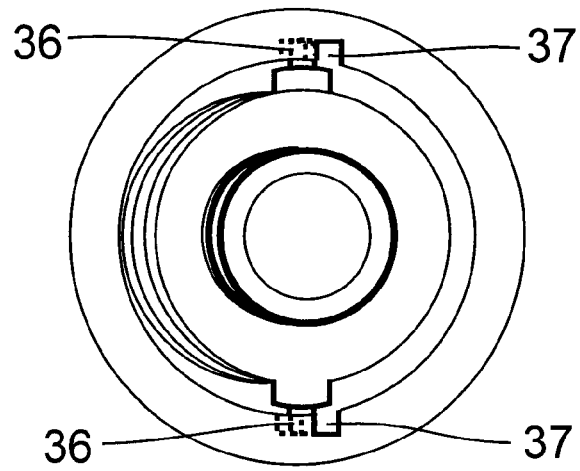
FIG. 10e is a top view illustrating partially inserting the cartridge of FIG. 10a into the bowl of FIG. 10b.
Figure 10F:
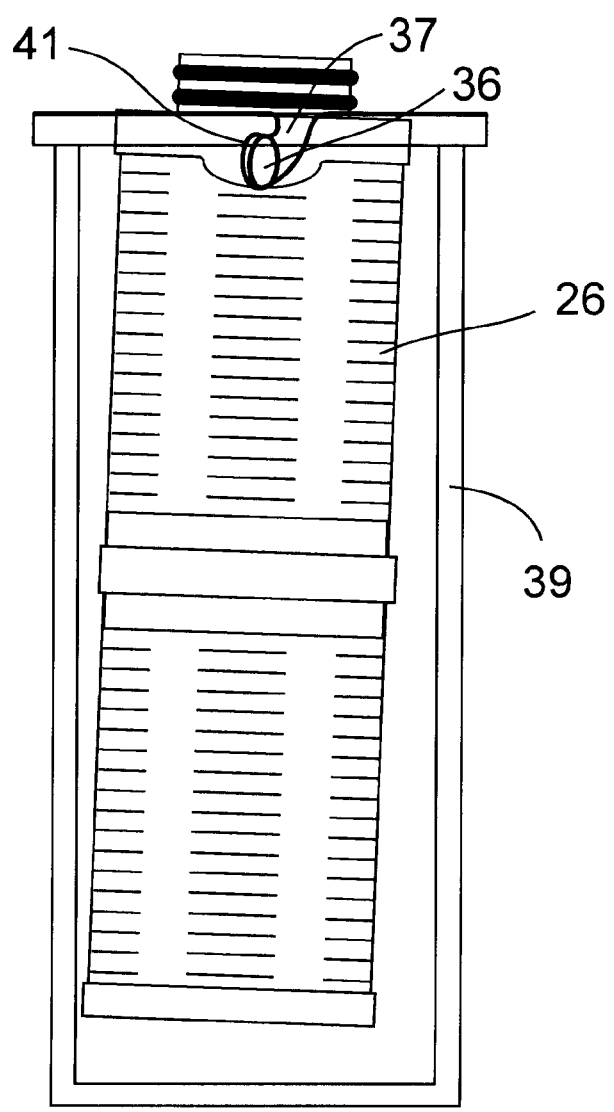
FIG. 10f is a side cross sectional view of the bowl and cartridge of FIG. 10e.
Figure 10G:
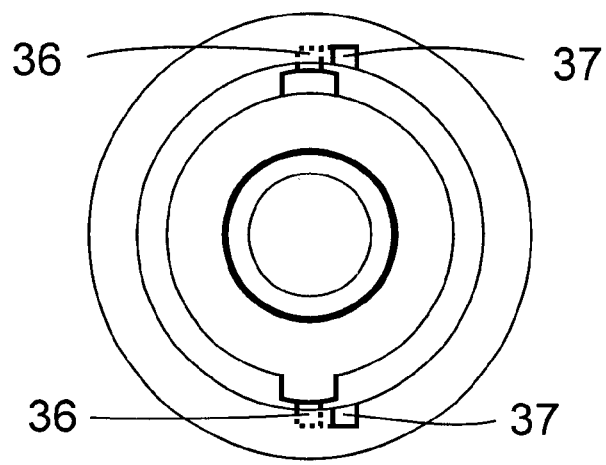
FIG. 10g is a top view illustrating fully inserting the cartridge of FIG. 10a into the bowl of FIG. 10b.
Figure 10H:
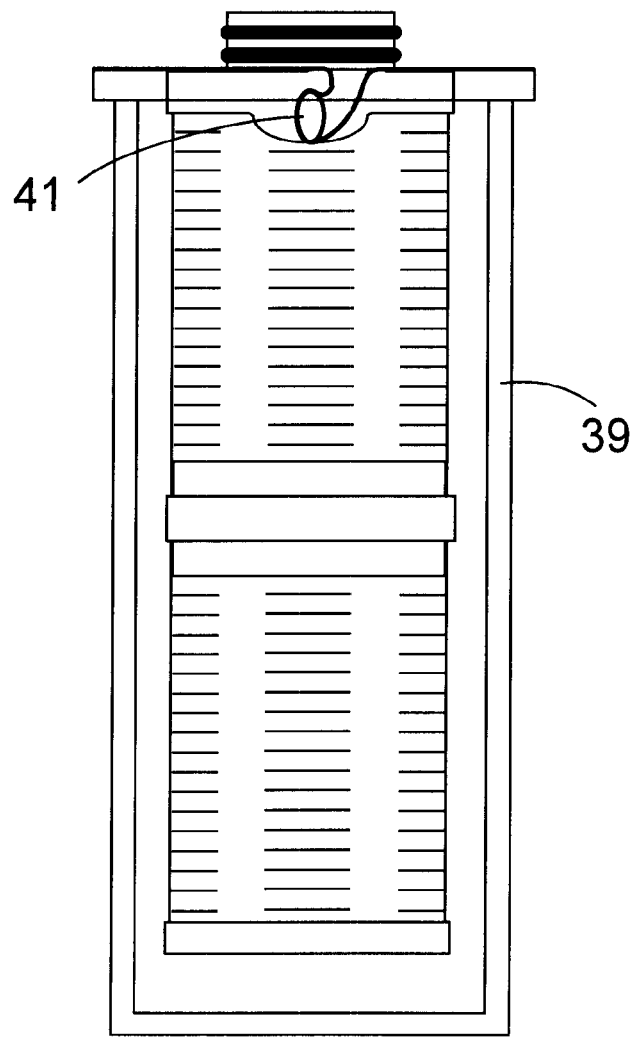
FIG. 10h is a side cross sectional view of the bowl and cartridge of FIG. 10g.

Referring to FIGS. 10a, 10b, 10c, 10d, 10e, 10f, 10g and 10h, the filter cartridge 26 having an outlet 32 also has flanges 35 from which extend lugs 36. The lugs as shown in the Figures are oval or ellipsiod in shape, although they can be of any shape suitable for securing the cartridge to the bowl, including circular or polygonal such as square or octogonal. The lugs 36 fit into slots 37 of bowl 39, the slots 37 are provided with a shoulder 38. As shown in FIGS. 10c and 10d, the lugs 36 are positioned into slots 37. As shown in FIGS. 10e and 10f, the lugs are moved within slots until they contact shoulders 38. The cartridge 26 is in a position where it is not centered within bowl 39 when the lugs 36 contact shoulder 38. As shown in FIGS. 10g and 10h, the lugs 36 are positioned at the ends 41 of slot 37 by rotating or translating cartridge 26 so that it is substantially centered within bowl 39. As a result of this rotation, the lugs 36 are snap fit between ends 41 and shoulder 38. While a snap fit is preferred to ensure a good retention, simple interference fitting may also be used. When it is desired to separate the cartridge 26 from the bowl 39, the cartridge 26 first is rotated without an additional force in a different direction to the position shown in FIGS. 10e and 10f to position lugs 36 past shoulder 38. The cartridge 26 then is subjected to a vertical force without an additional force in a different direction to remove the lugs 36 from the slots 37. The shape of the lugs 36 is such that they are slightly larger than the space in the slots 37 at the shoulder 38. Thus, the shoulder 38 holds the lug 36 in position within the slot by friction as a result of the lug being snap fit into the portion of the slot 37 past the shoulder 38.

Figure 11:
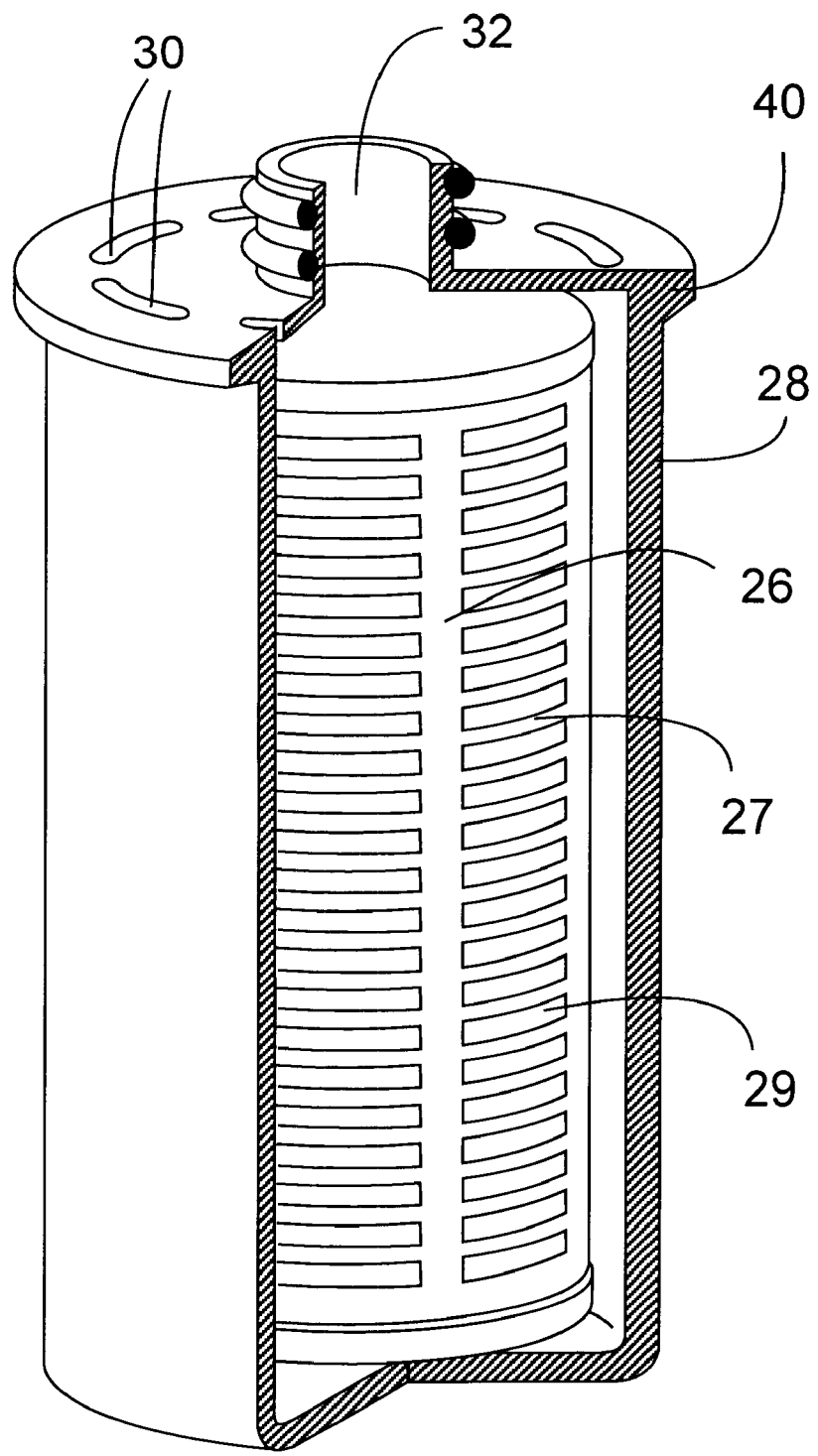
FIG. 11 is a cross sectional view of a one-piece filter cartridge-bowl construction useful in the present invention.

Referring to FIG. 11, a one-piece filtration cartridge-bowl is shown. The filtration cartridge 26 is positioned within bowl 28. The filtration cartridge 26 includes a cartridge such as a pleated cartridge 27 surrounded by supporting ribs 29. However as the filtration cartridge 26 is sealed within the bowl 28, one may use a cartridge which has no cage as the bowl 28 itself provides the protection of the filtration cartridge 26 during use and handling. The bowl 28 includes a plurality of fluid inlets 30 through which a fluid feed is introduced into bowl 28. The bowl 28 is provided with an outlet 32 through which permeate is recovered from the filtration cartridge 26. If desired, the fluid flow can be reversed whereby fluid feed is introduced through outlet (now inlet) 32 and permeate is removed through inlet (now outlet) 30. The filtration cartridge 26 and bowl 28 can be joined together to form a single piece by any conventional means such as by molding or by the use of adhesive, thermal bonding, acoustic bonding or the like.

Figure 12:
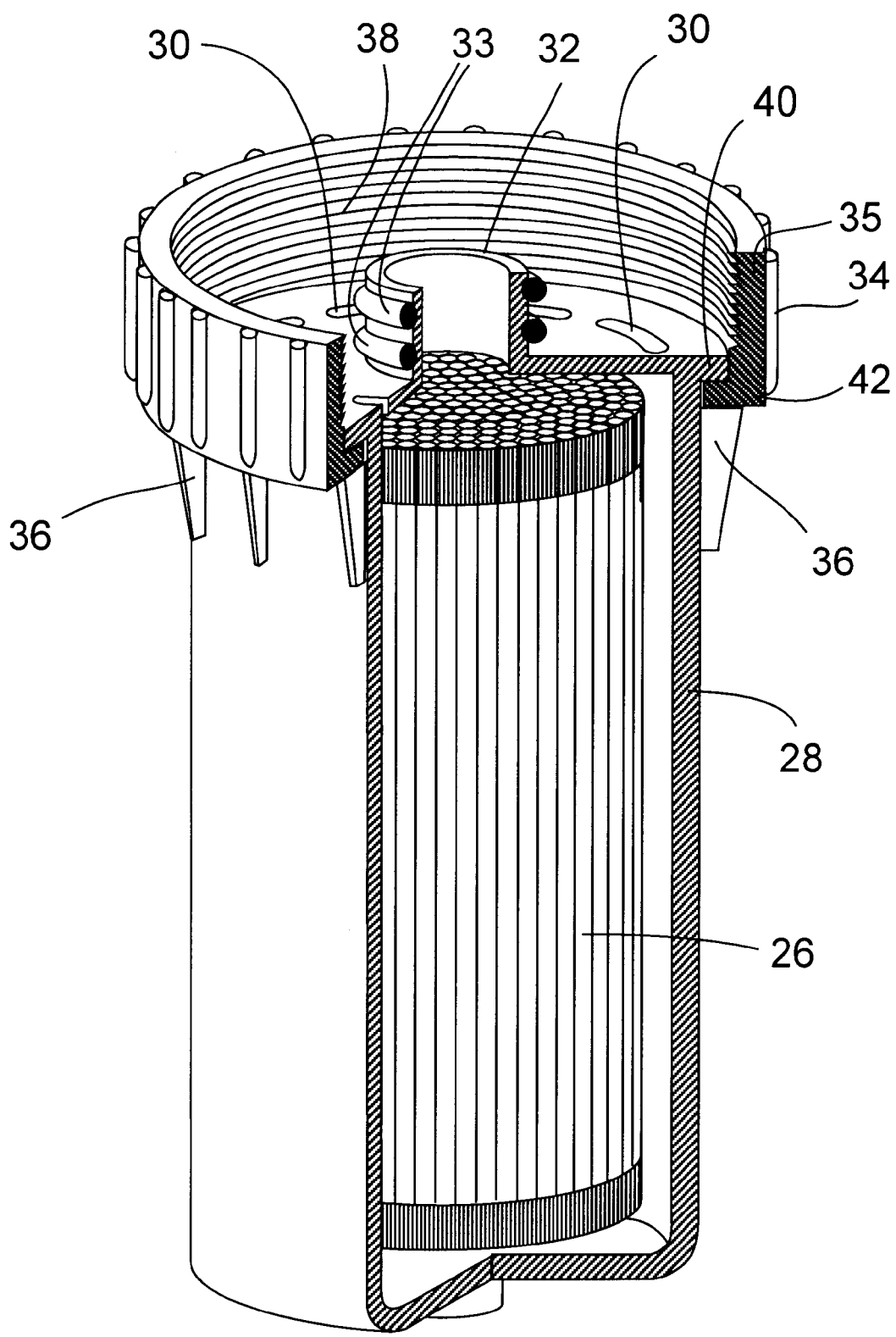
FIG. 12 is a cross sectional view of the construction of FIG. 11 in a bowl and including means for sealing it to a manifold it to a manifold.
Figure 13:
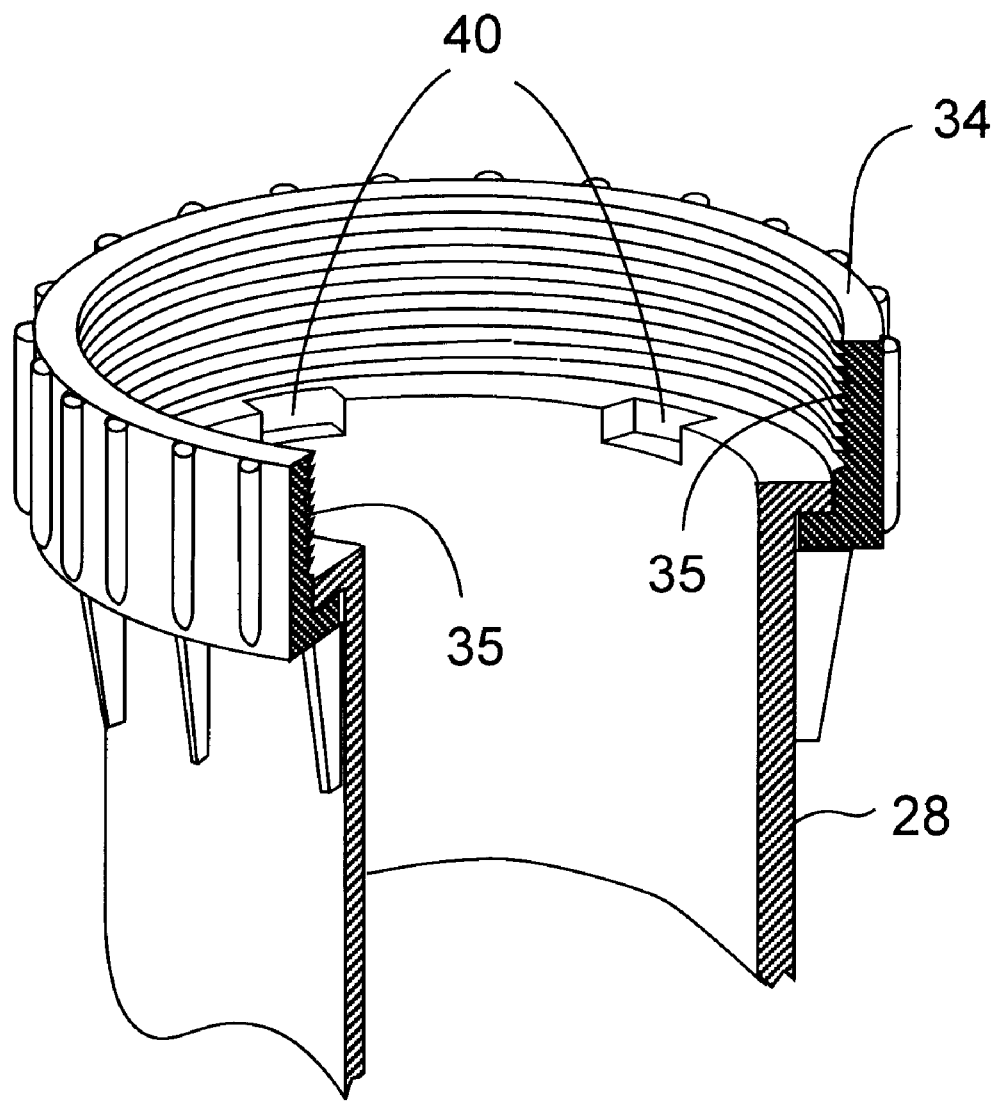
FIG. 13 is a cross sectional view of a bowl including slots for accepting a filter cartridge construction of FIG. 15.
Figure 15:
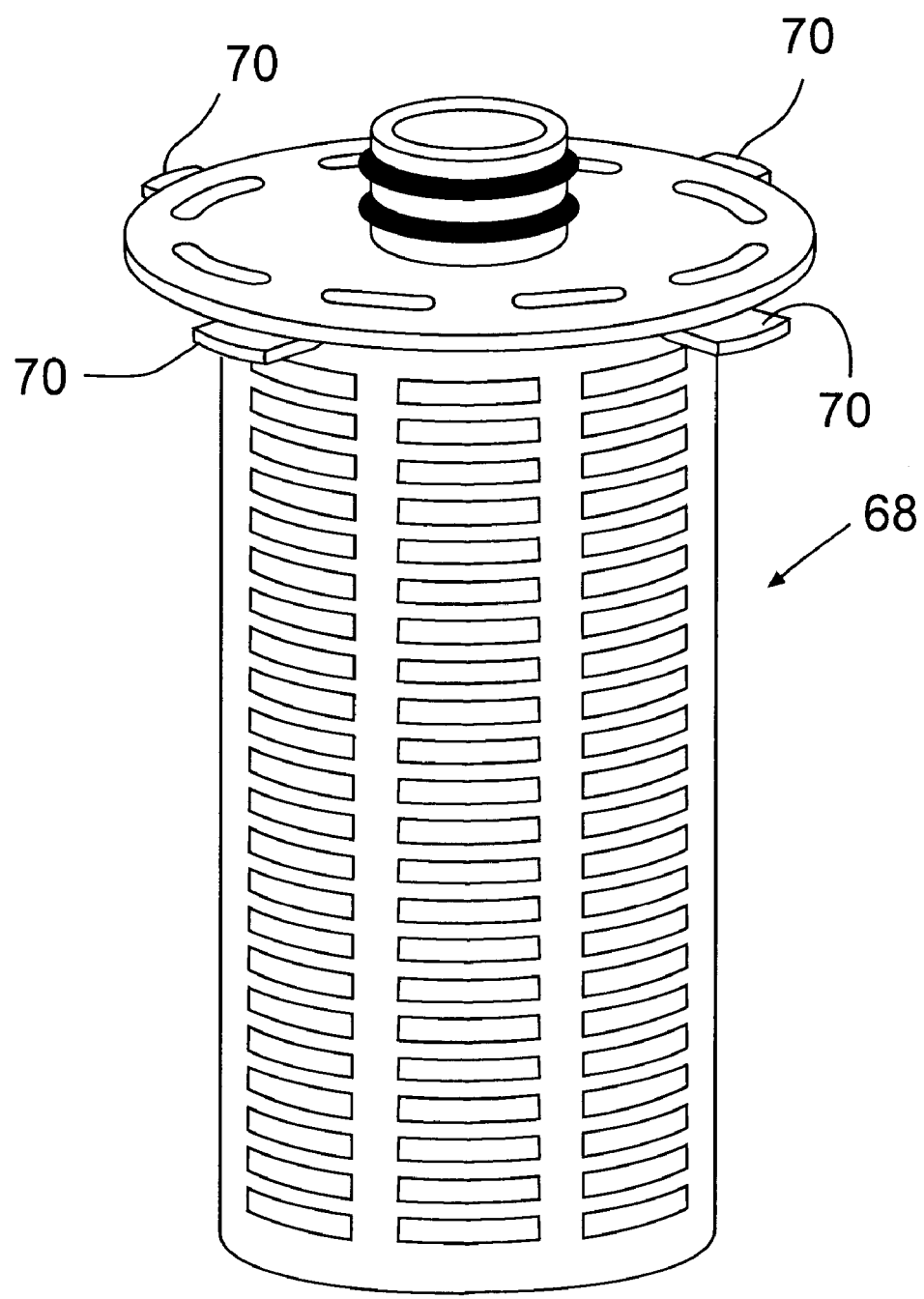
FIG. 15 is an isometric view of a filter cartridge of this invention having flanges that snap fit into a bowl.
Figure 16A:
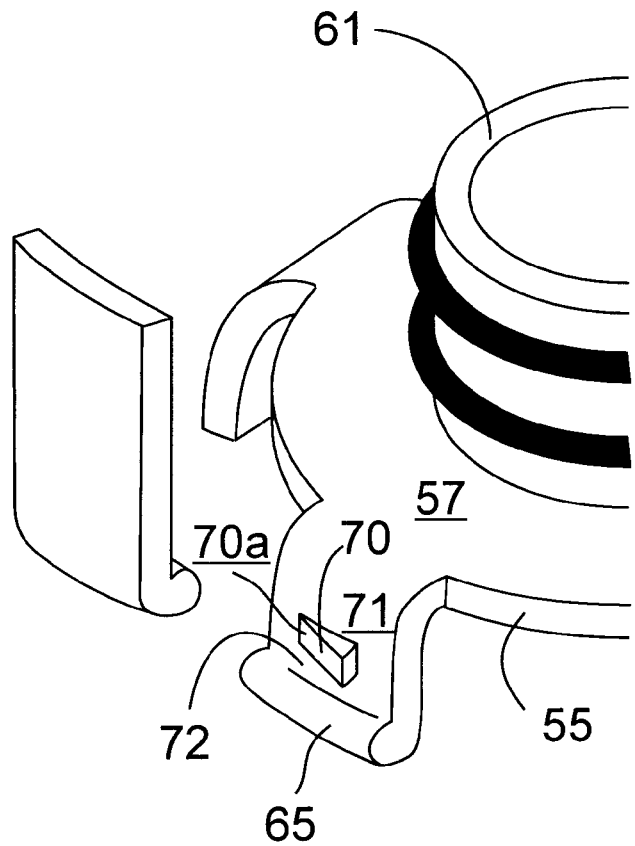
Figure 16B:
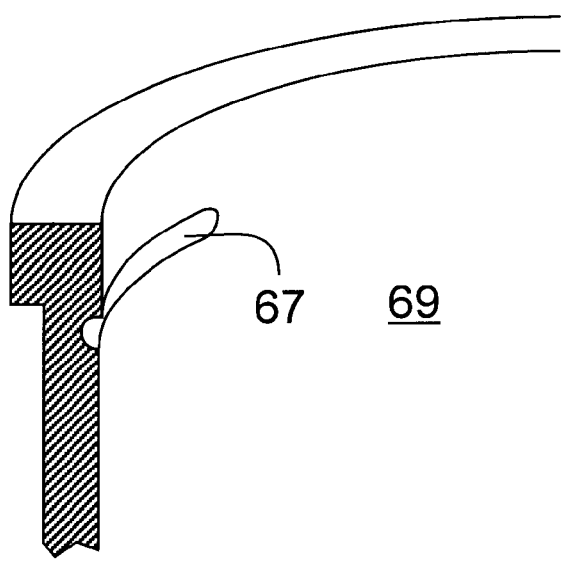
Figure 16C:
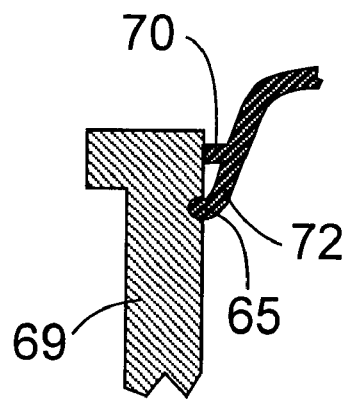
FIG. 16c is a side view of the cartridge of FIG. 16a fit into the bowl of FIG. 9b.
Figure 16D:
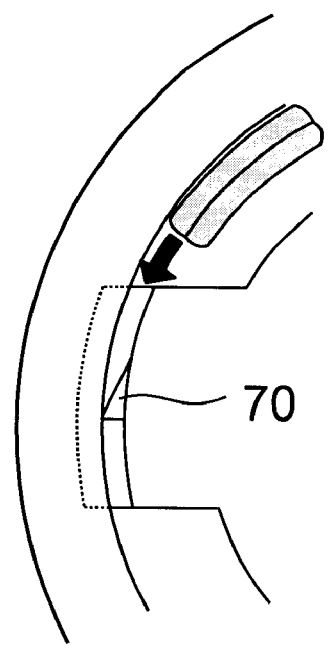
FIG. 16d is a top view of the construction of FIG. 16c.
Figure 16E:
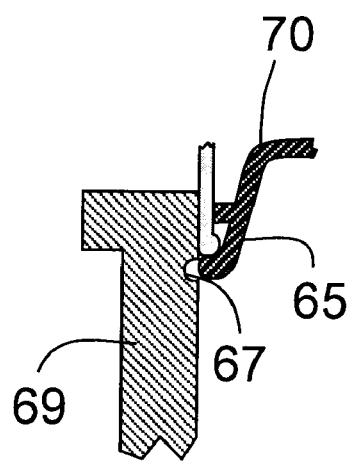
FIG. 16e is a side view illustrating the separation of the filter cartridge from the bowl of FIG. 16c.
Figure 16F:
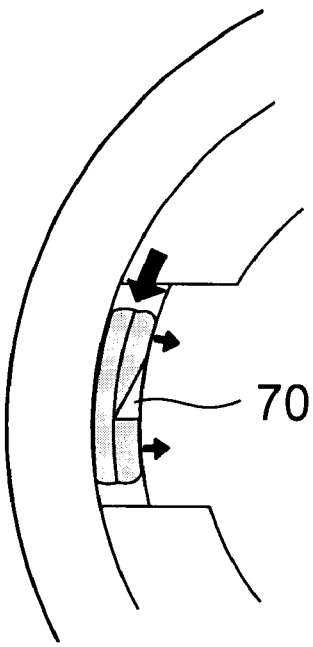
FIG. 16f is a top view of the construction of FIG. 16e.

Referring to FIG. 12, the filter cartridge-bowl construction of FIG. 11 is shown which includes a means for securing the cartridge-bowl construction to a manifold (not shown) wherein the construction includes the bowl 28 and the filter cartridge 26. The outer flange 40 of the bowl 28 is supported by the inner flange 42 of the rotatable ring 34. The ring 34 includes threads 35 on its inner surface which mate with threads 13 on the manifold of FIGS. 8 or 9. The ring 34, in turn, is supported about bowl 28 by rods 36 that are formed integrally with the bowl 28 such as by being molded thereto. By virtue of the ring 34 being supported by the rods 36, it is free to rotate in either the clockwise direction or in the counterclockwise direction. When the ring 34 is rotated in the clockwise direction and the threads 35 are in contact with the threads 13 of a manifold 10 or 11, the outlet 32 having O rings 33 thereon is raised to become sealed within outlet 15 of manifold 10 or 11 (FIGS. 8 or 9). The arrangement and number of O rings used is not critical to the invention an dvaries from maker to maker and application to application. Since the bowl 28 and filter cartridge 26 are formed integrally, the bowl 28 and cartridge 26 are raised or lowered as a single unit when the ring 34 is rotated with respect to the manifold 10 or 11. By operating in this manner, the bowl 28 and filter cartridge 26 need not be moved relative to each other to position the filter construction of this invention in place or to remove the bowl 28 and filter cartridge 26 from the manifold 10 or 11 (FIGS. 13 and 15). Thus, the length of space to assemble or disassemble the filter construction of this invention is the length of the outlet 32 rather than the entire length of the bowl 28 or the cartridge 26.

Referring to FIGS. 13 and 15, a construction is illustrated for joining a filter cartridge and a bowl to form an integral unit. The bowl 28 includes the ring 34 and internal threads 35. The bowl 28 also includes slots 40. The flanges 70 of filter cartridge 68 fit into slots 40 so that the flanges are snap fit to be positioned within slots 40. This positioning of the filter cartridge locks it into position and permits the cartridge 68 to be moved as a unit with the bowl 28 away from or in sealing contact with a manifold (not shown).

Figure 14A:
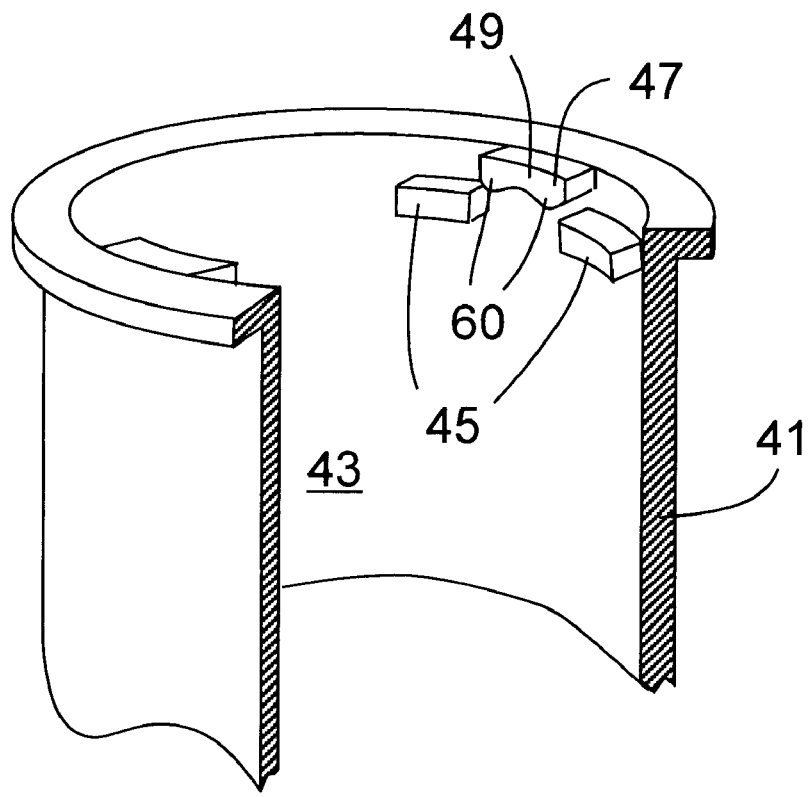
FIG. 14a is a cross sectional view of an alternative bowl construction of this invention.
Figure 14B:
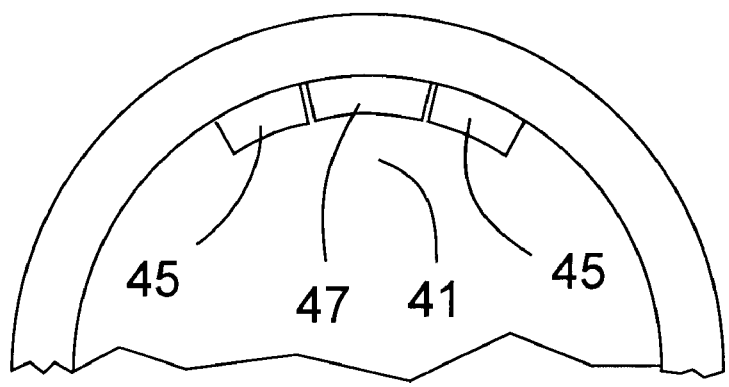
Figure 14C:
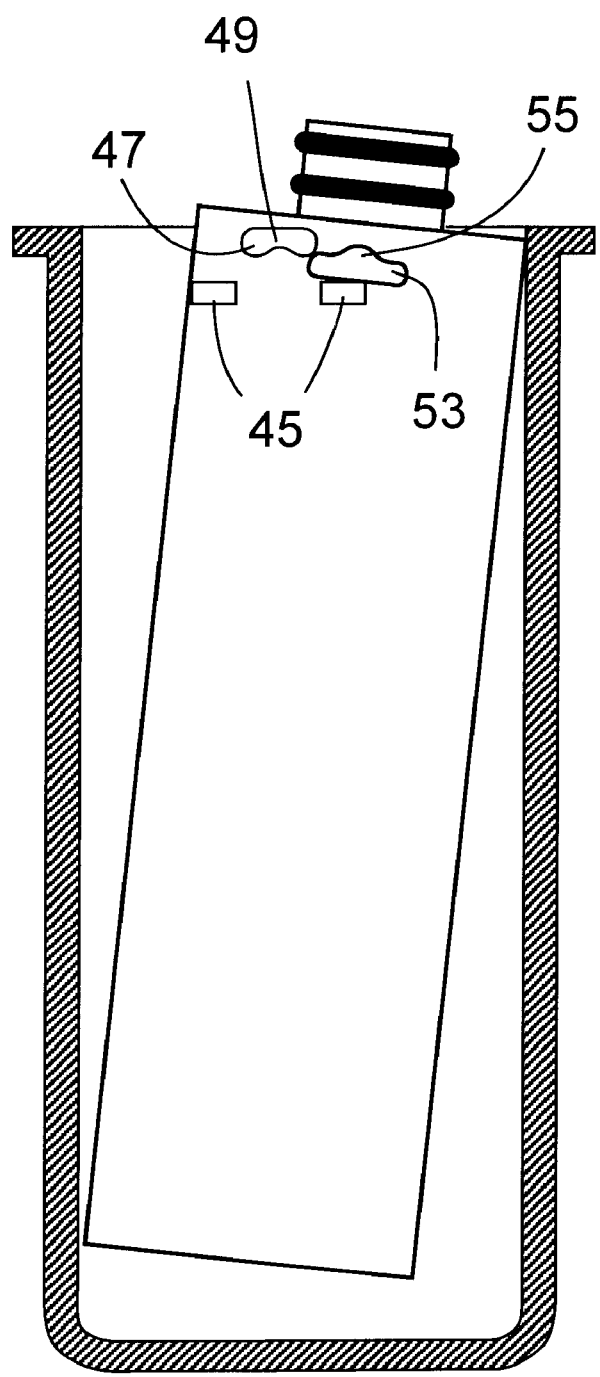
Figure 14E:
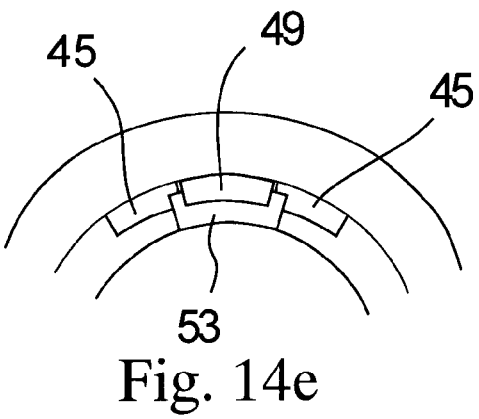
FIG. 14e is a partial top view of the bowl and cartridge of FIG. 14d.
Figure 14D:
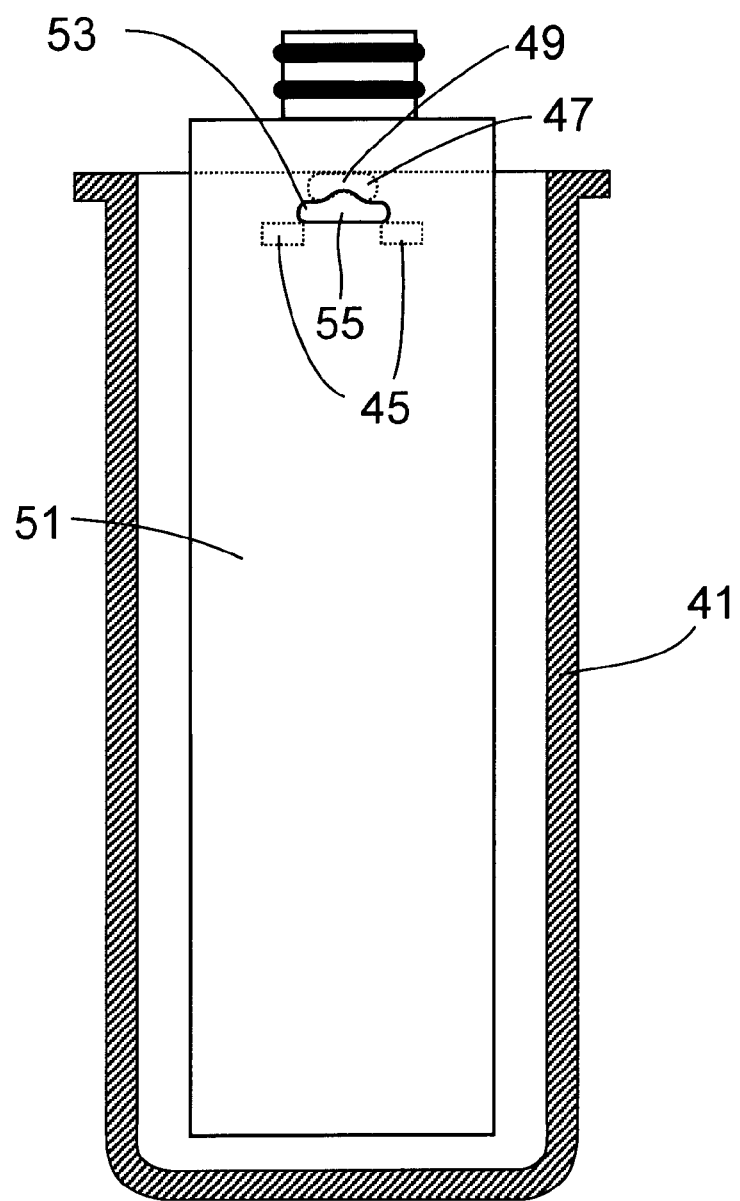

Referring to FIGS. 14a, 14b, 14c, and 14e, the bowl 41 includes, on its inner surface 43 two spaced apart flanges 45 and a third flange 47 having a notch 49. A filter cartridge 51 having a flange 53 is first positioned so that flange 53 is positioned between flange 47 and flanges 45 (FIG. 14c). The cartridge 51 then is slid into the position shown in FIG. 14d so that flange 53 having shoulder 55 is positioned so that shoulder 55 fits into notch 49 thereby retaining cartridge 51 on bowl 41. It is to be understood that two sets of the flanges shown are positioned about 180 degrees apart on the inside surface 43 of the bowl 42. Since the shoulder 55 is slightly larger than the slight extensions 60 surrounding the notch 49, the shoulder 55 is held in place within notch 49 by friction. Thus, the shoulder 55 is snap fit in notch 49.

Referring to FIGS. 16a, 16b, 16c, 16d, 16e and 16f the top portion 57 of filter cartridge 59 having fluid outlet or inlet 61 includes arms 65 which are snap fit into slots 67 within the inner surface periphery of a bowl 69. After the arms 65 are snap fit into the slots 67, the bowl 69 and filter cartridge 59 can be sealed into a manifold (not shown) as a single unit. The flange 65 is provided with a wedge shaped element 70 secured to surface 71 and spaced apart from surface 72. When separation of the bowl 69 from the cartridge 59 is desired, a hand held tool can be slid along surface 70a and under wedge 70 to bend flange 65 away from slot to effect removal therefrom.

Figure 17:
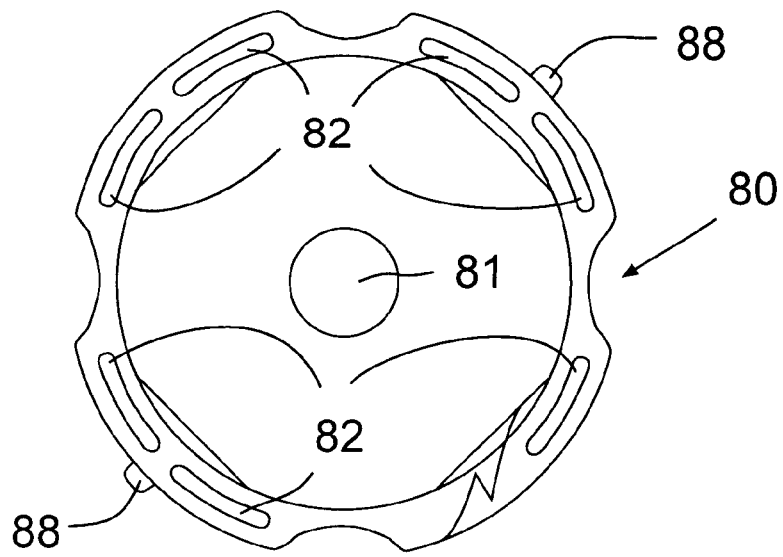
FIG. 17 is a top view of a collar that can be utilized with a filter cartridge.
Figure 18:
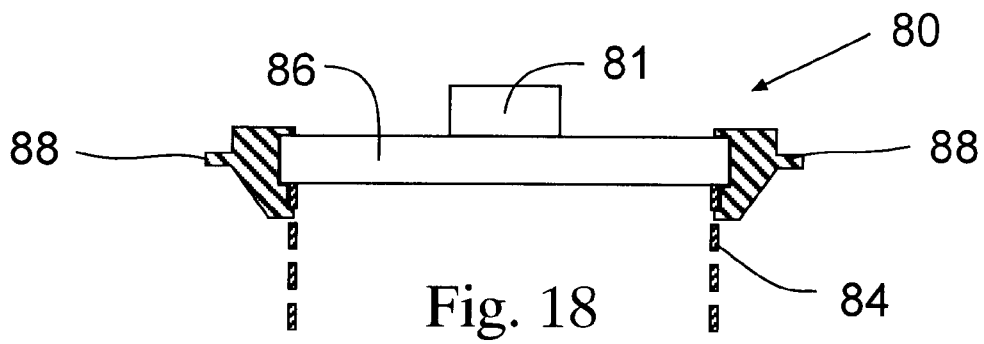
FIG. 18 is a cross sectional view of the collar of FIG. 17 positioned about a filter cartridge.
Figure 19:
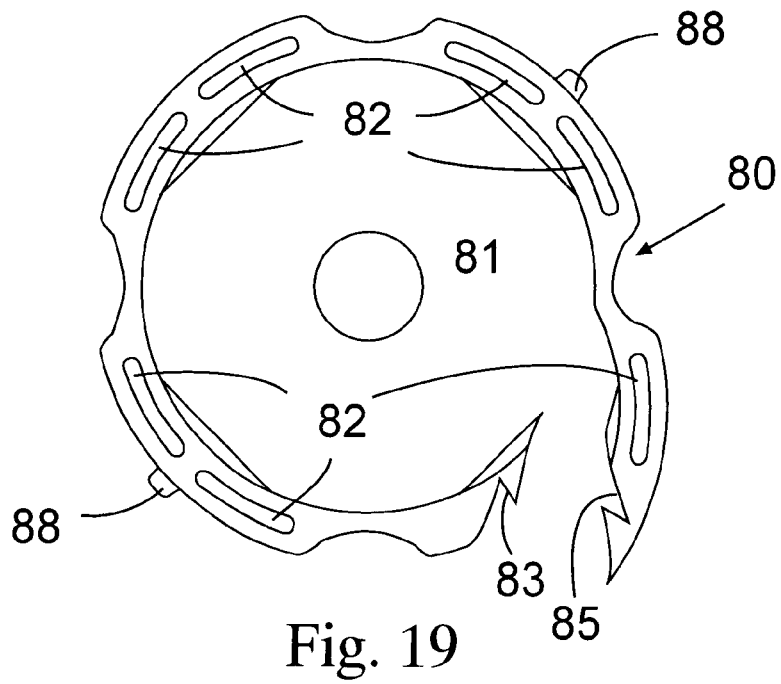
FIG. 19 is a top two of the collar of FIG. 17 when opened.
Figure 20:
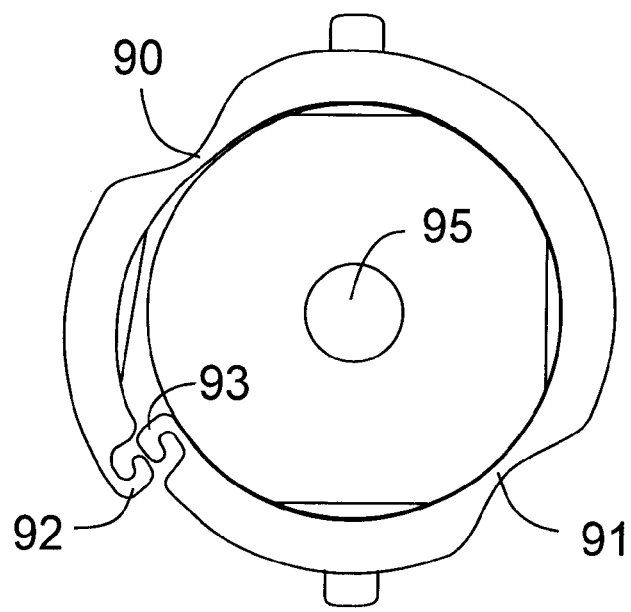
FIG. 20 is a top view of a collar positioned about a filter cartridge.

Referring to FIGS. 17, 18 and 19, a collar 80 is illustrated which is utilized in conjunction with a filter cartridge free of a flange which can be snap fit into a slot of a bowl as discussed above. The collar 80 provides the advantage that it can be removed from a used filter cartridge prior to discarding the used cartridge so that the collar 80 can be reused with a fresh filter cartridge. The collar 80 is provided with feed inlets 82 to the bowl 28 (FIG. 20). The collar 80 attaches to a flange 86 of a filter cartridge 84. The collar 80 is provided with flanges 88 that are fit into slots of a bowl as described above. The design of the flanges can be of any design provided they produce the desired retention function. The collar 80 includes a hinge 81 so that a portion of it can be rotated to engage hook elements 83 and 85 to engage or disengage the collar 80 with or from the filter cartridge 84. Permeate is removed from the filter cartridge through outlet 81.

Figure 21:
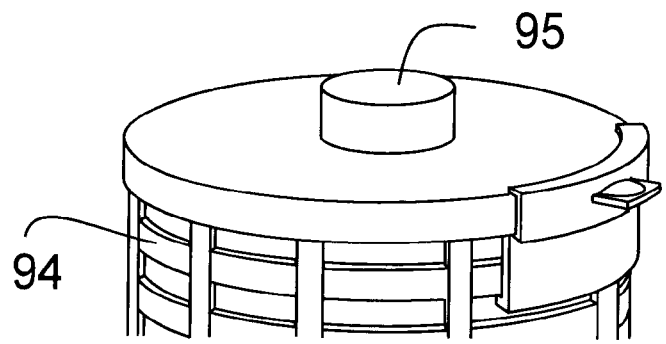
FIG. 21 is a partial isometric view of a filter cartridge having a partial collar.
Figure 22:
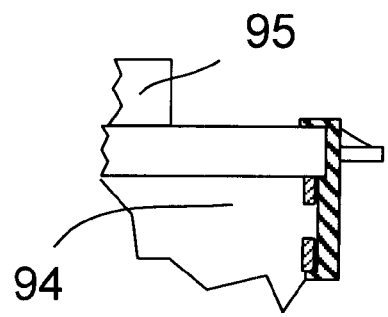
FIG. 22 is a partial side view of the collar of FIG. 21.

Referring to FIGS. 20, 21 and 22 an alternative collar construction is shown that includes two hinges 90 and 91 as well as mating hooks 92 and 93. The collar fits about the periphery of filter cartridge 94 which includes a permeate outlet 95. The flanges 96 fit into mating slots of a bowl as described above with reference to FIG. 13.

Figure 23:
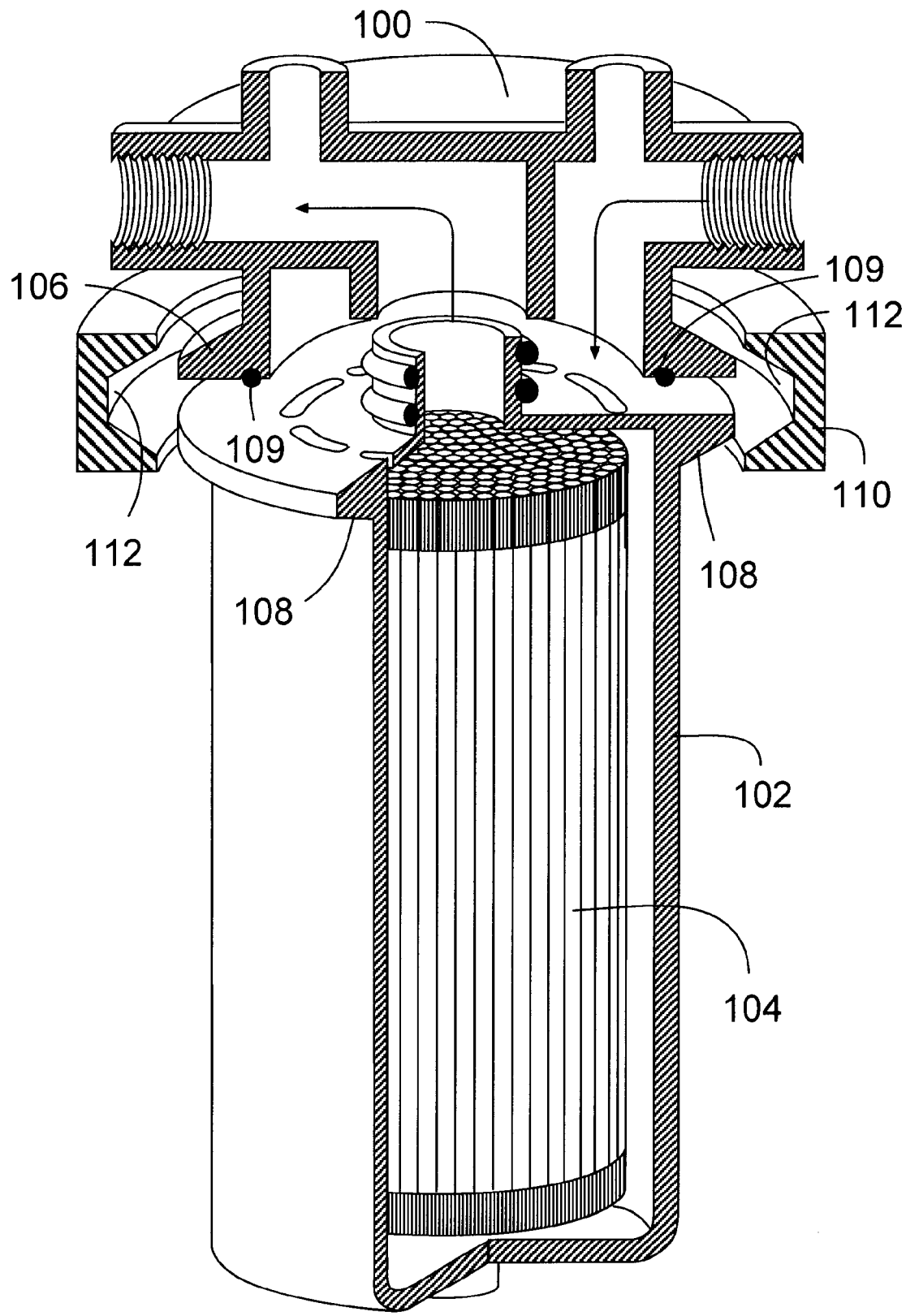
FIG. 23 is an exploded cross sectional view of a filtration module of this invention.

Referring to FIG. 23, an alternative means for joining the manifold 100 to the bowl 102 and filter cartridge 104 is shown. The manifold 100 is provided with a flange 106 that is positioned of flange 108 of bowl 102. A sealing O ring 109 is interposed between flanges 106 and 108 to seal the interior of the bowl from the surrounding environment. A clamp 110 having a wedge shaped interior surface 112 fits over flanges 106 and 108 to force and maintain the flanges 106 and 108 together. The clamp can have its ends locked together in the manner described above with reference to FIGS. 19 and 20. The bowl 102 and filter cartridge 104 are of unitary construction either as one piece, two separable pieces or three separable pieces including a collar as described above.

Figure 24:
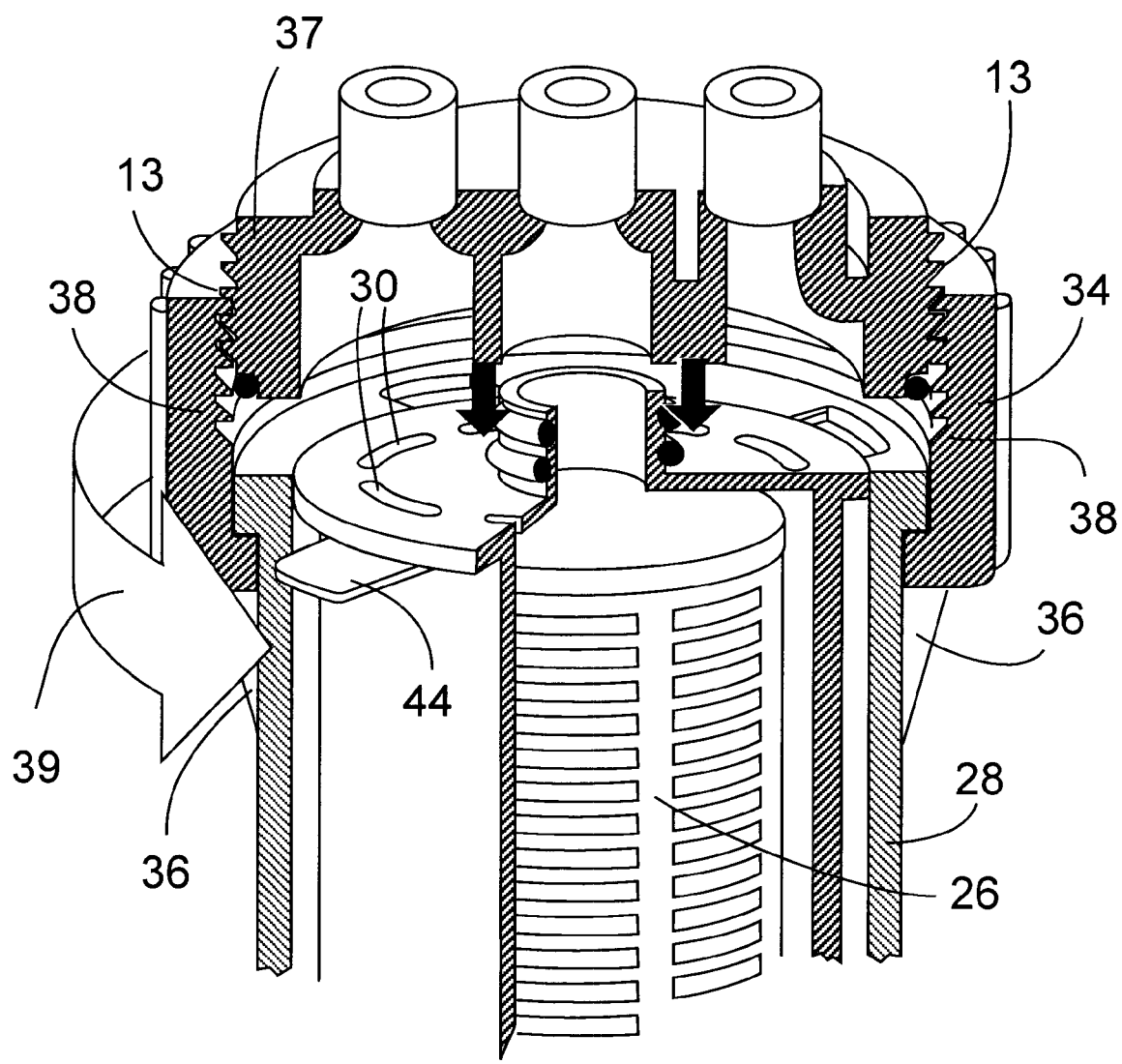
FIG. 24 illustrates the tightening of the filter cartridge of FIG. 12.
Figure 25:
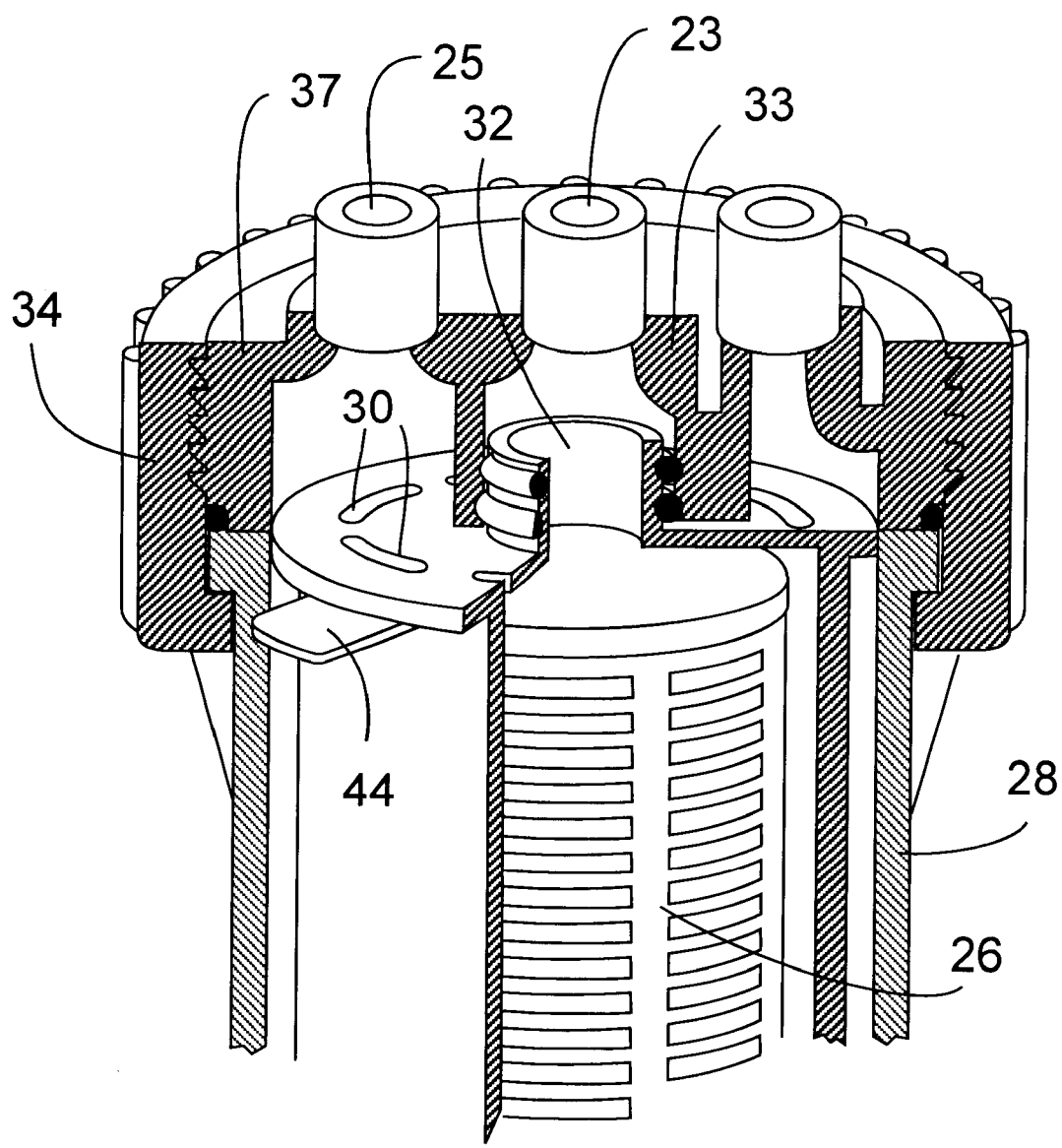
FIG. 25 is a cross sectional view showing the filtration module of FIG. 24.
Figure 26:
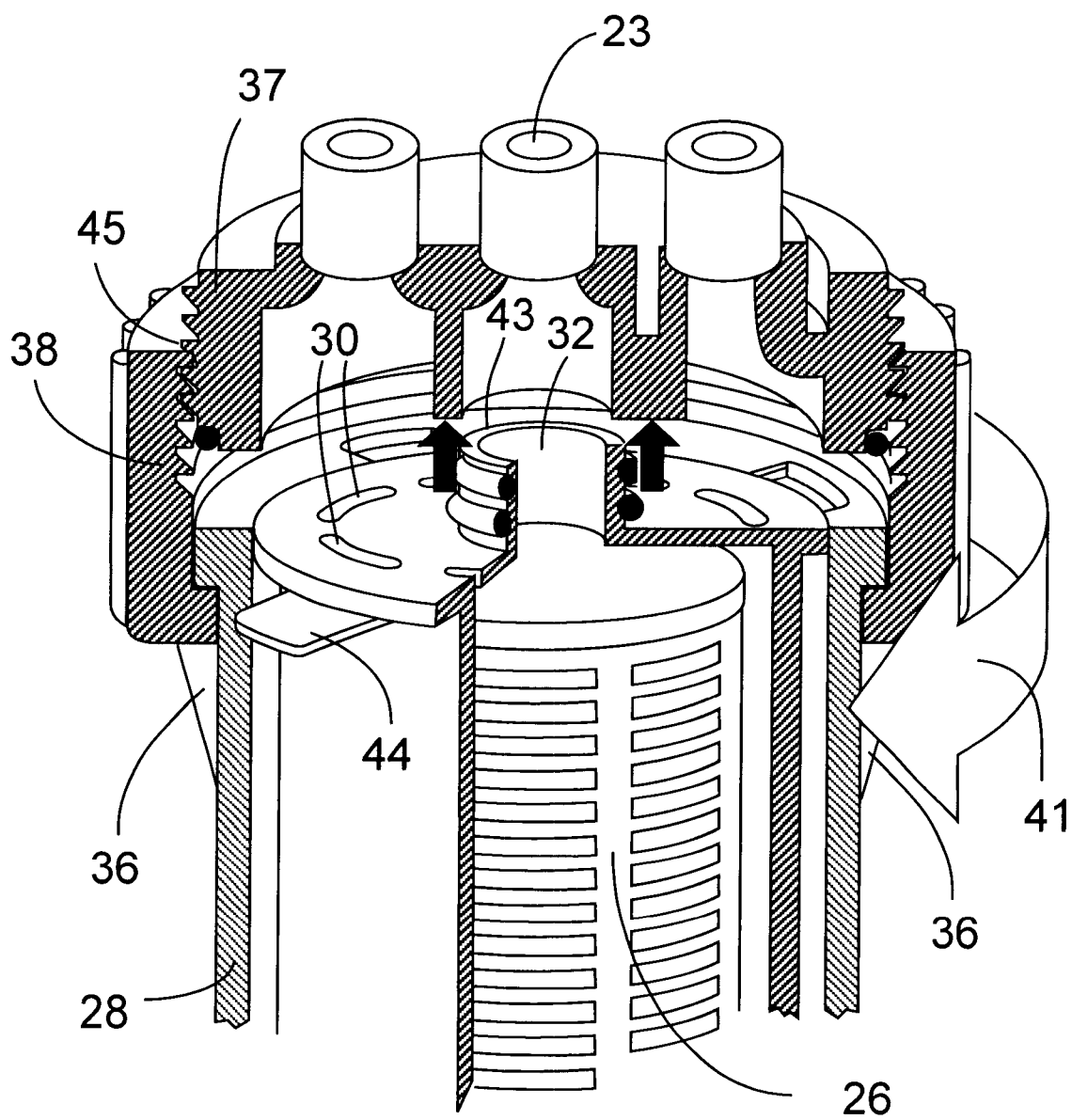
FIG. 26 is a cross sectional view illustrating the removal of the filtration cartridge from a manifold.

FIGS. 24, 25 and 26 illustrate the installation and removal of the filtration module of this invention shown in with respect to the filter cartridge-bowl construction shown in FIG. 5. As shown in FIG. 24, the threads 38 of ring 34 are contacted with the threads 13 of manifold 37. The ring 34 then is rotated counterclockwise as illustrated by arrow 39 moves the filter cartridge 26 and bowl 28 toward the manifold 37 until the filter cartridge 26 and bowl 28 are in the position relative to the manifold 37 shown in FIG. 25. This relative movement is achieved by virtue of rotation of the ring 34 and because the ring 34 is supported by the rods 36. The filter cartridge 26 and bowl 28 move as a unit since the filter cartridge is locked into bowl 28 as described above with reference to FIG. 7a. When in the position shown in FIG. 25, the permeate outlet 32 is sealed in position within permeate outlet 23 of manifold 37 by virtue of the O rings 33. Fluid feel is introduced into the bowl 28 through feed inlet 25, is passed through the filter cartridge 26 and is removed through permeate outlets 32 and 23. Upon completion of filtration, the ring 34 supported by rods 36 is rotated in a clockwise direction as illustrated by arrow 41. This clockwise rotation causes removal of the permeate outlet 32 from contact with the manifold 37. The filter cartridge 26 and bowl 28 are removed as a unit from the manifold 37. Thus only a distance from the top surface 43 of the permeate outlet 32 to the bottom surface 45 of the manifold 37 is needed to effect removal of the filter cartridge at the point of use rather than the distance comprising the entire length of the filter cartridge as required with the filtration modules of the prior art.

Figure 27:
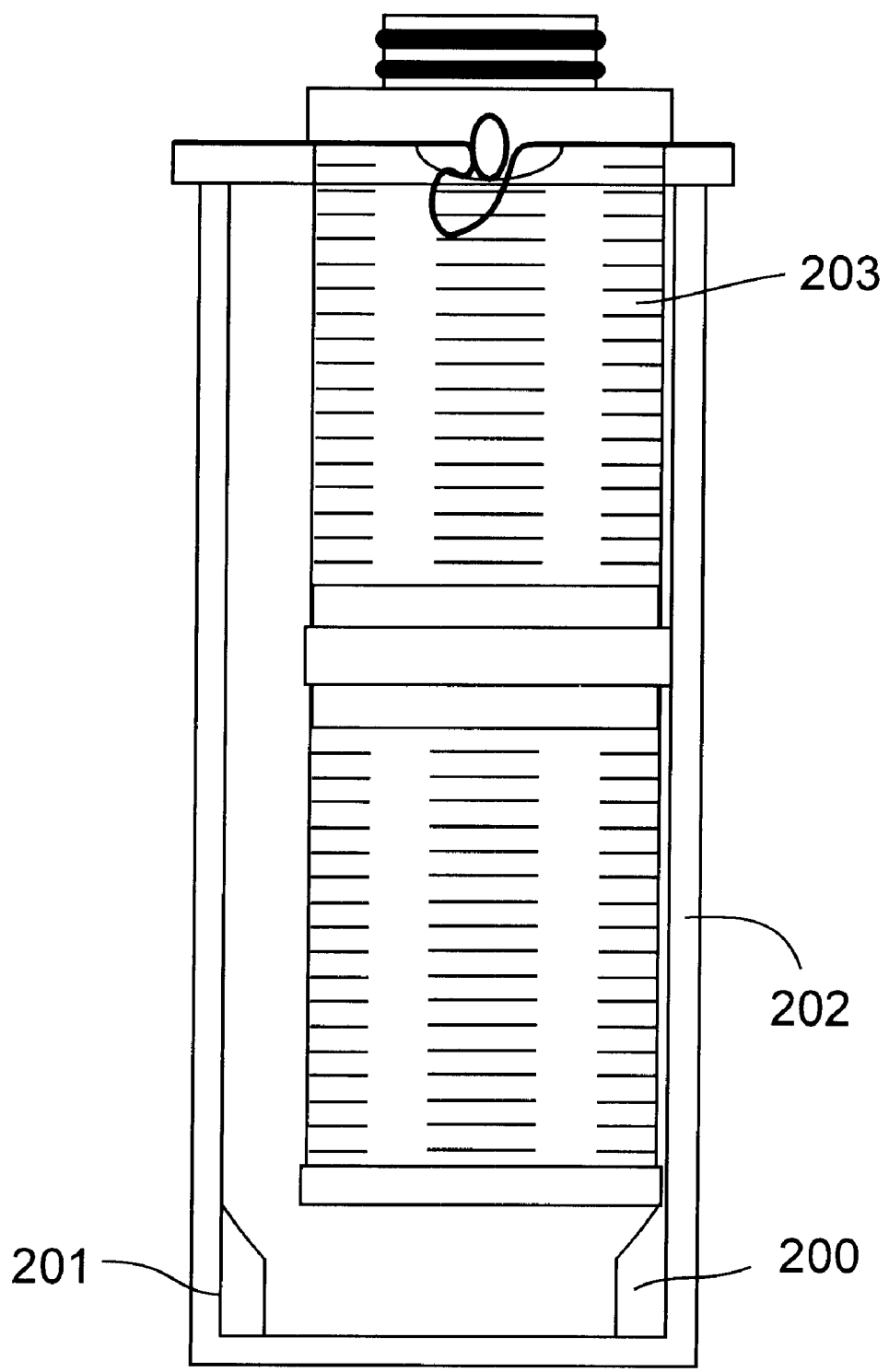
FIG. 27 is a cross sectional view showing the alignment fins in the bowl.

FIG. 27 shows another preferred embodiment of the present invention. In some applications, the cartridge is inserted into the bowl on an angle, such as is shown in FIG. 10a to 10h.

One or more alignment fins 200 are formed on the lower inner surface 201 of the bowl 202. Those fins allow the cartridge 203 to be trued in a vertical alignment as it is placed into the bowl 202. The number of fins 200 used preferably is at least from 2 to 6 with 3 being the most preferred. The fins 200 preferably are equally spaced from each other around the circumference of the inner surface 201. As shown the fins 200 are of a stepped configuration with the upper portion being on angle less than that of vertical and the lower portion being substantially vertical in orientation. This preferred embodiment allows for the cartridge 203 to be easily inserted into the housing and rest adjacent the bottom of the housing. If desired, other arrangements of fins as to angle, length, height may be used and are not critical to the invention so long as they provide adequate mounting and demounting of the cartridge from the housing.

Figure 28:
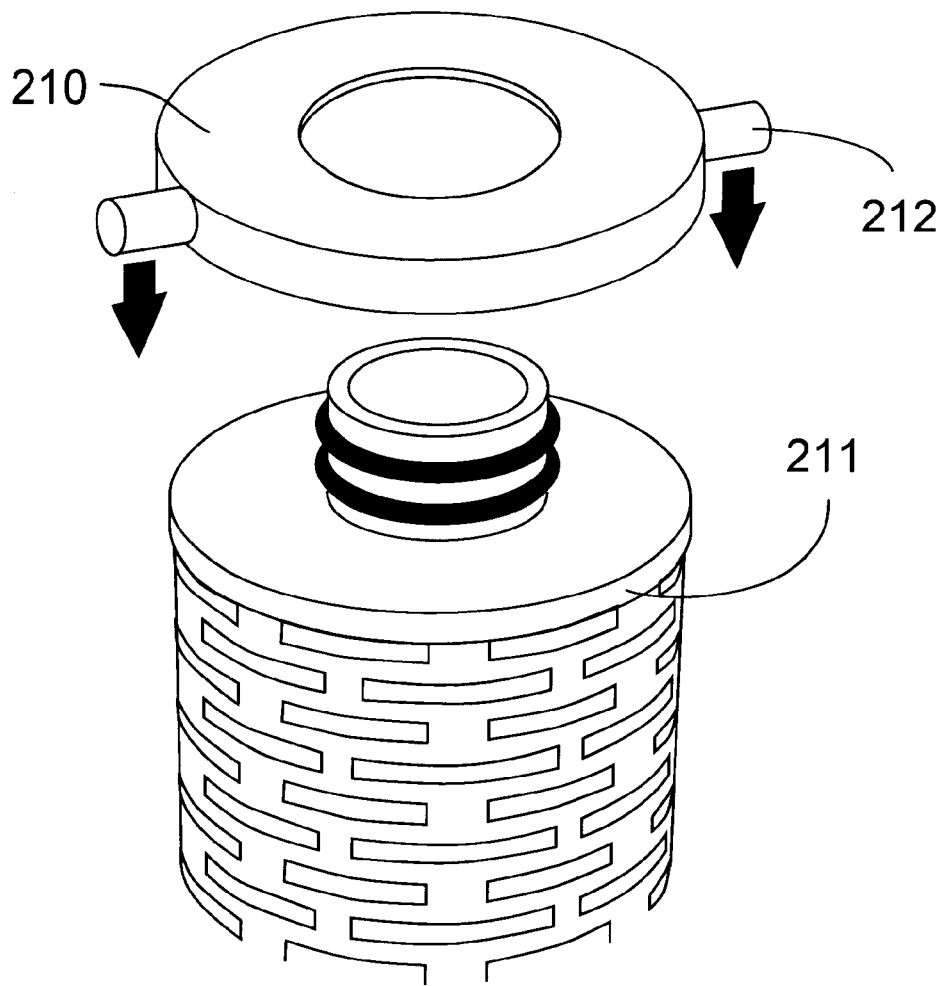
FIG. 28 is planar view of another embodiment of the present invention.

Additionally, the collar feature of the present invention as shown in FIGS. 17–19 may be comprised of a collar that contains no hinges. Such an embodiment is shown in FIG. 28. In this embodiment, the collar 210 is simply snap-fit over the end of the cartridge portion 211 to which it is attached and held in place to the cartridge by the snap-fit design. Further, the design of this embodiment or the embodiment of FIGS. 17–19 may use the flange as shown in FIGS. 17–19 or it may use a bayonet or lug 212 as shown in FIG. 28 as the means for attaching the cartridge to the housing. The selection of the attachment means is not critical to the invention.

Figure 29:
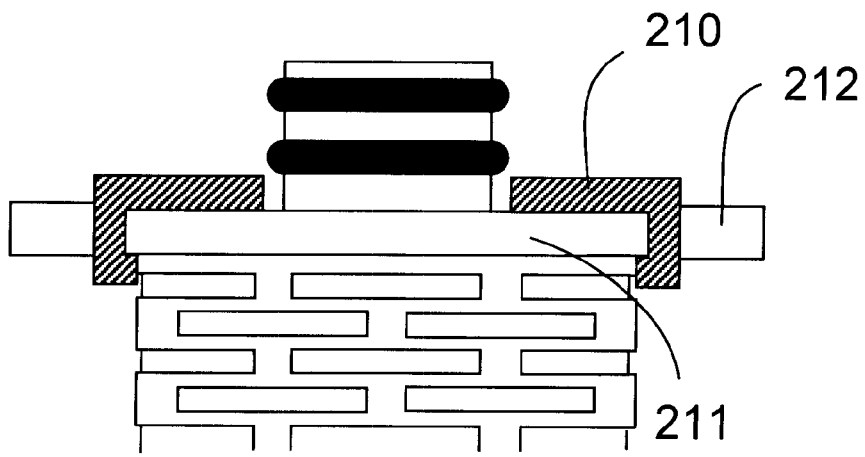
FIG. 29 is a cross sectional view showing the filtration module of FIG. 28.

FIG. 29 shows the embodiment of FIG. 28 in cross section as attached to the cartridge.

Figure 30:
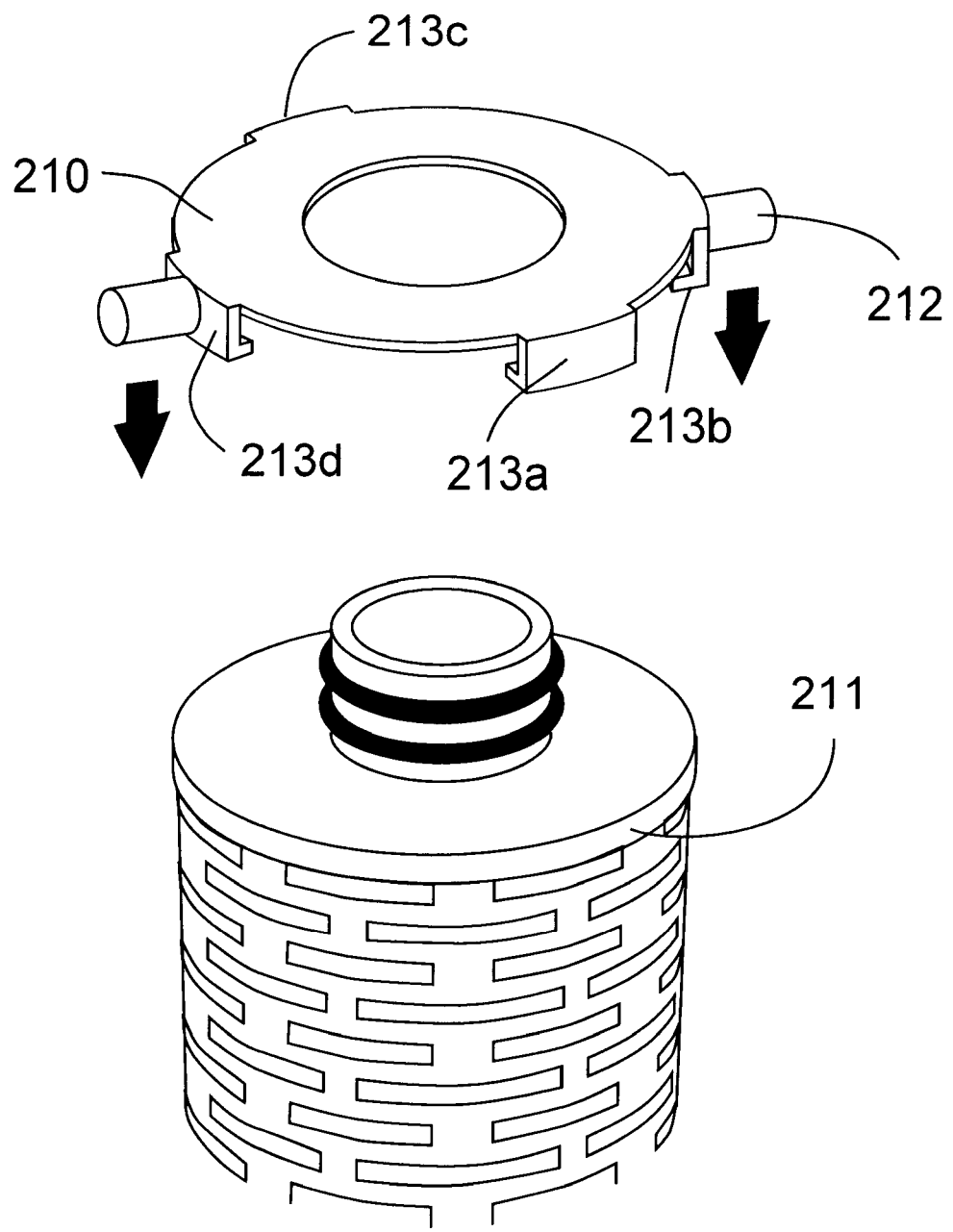
FIG. 30 is planar view of a modification of the embodiment of FIG. 28.

FIG. 30 shows a second embodiment of the snap fit design of FIGS. 28 and 29 wherein the portion which extends over and beyond the top of the cartridge is formed of two or more distinct portions 213 A–D.

Figure 31:
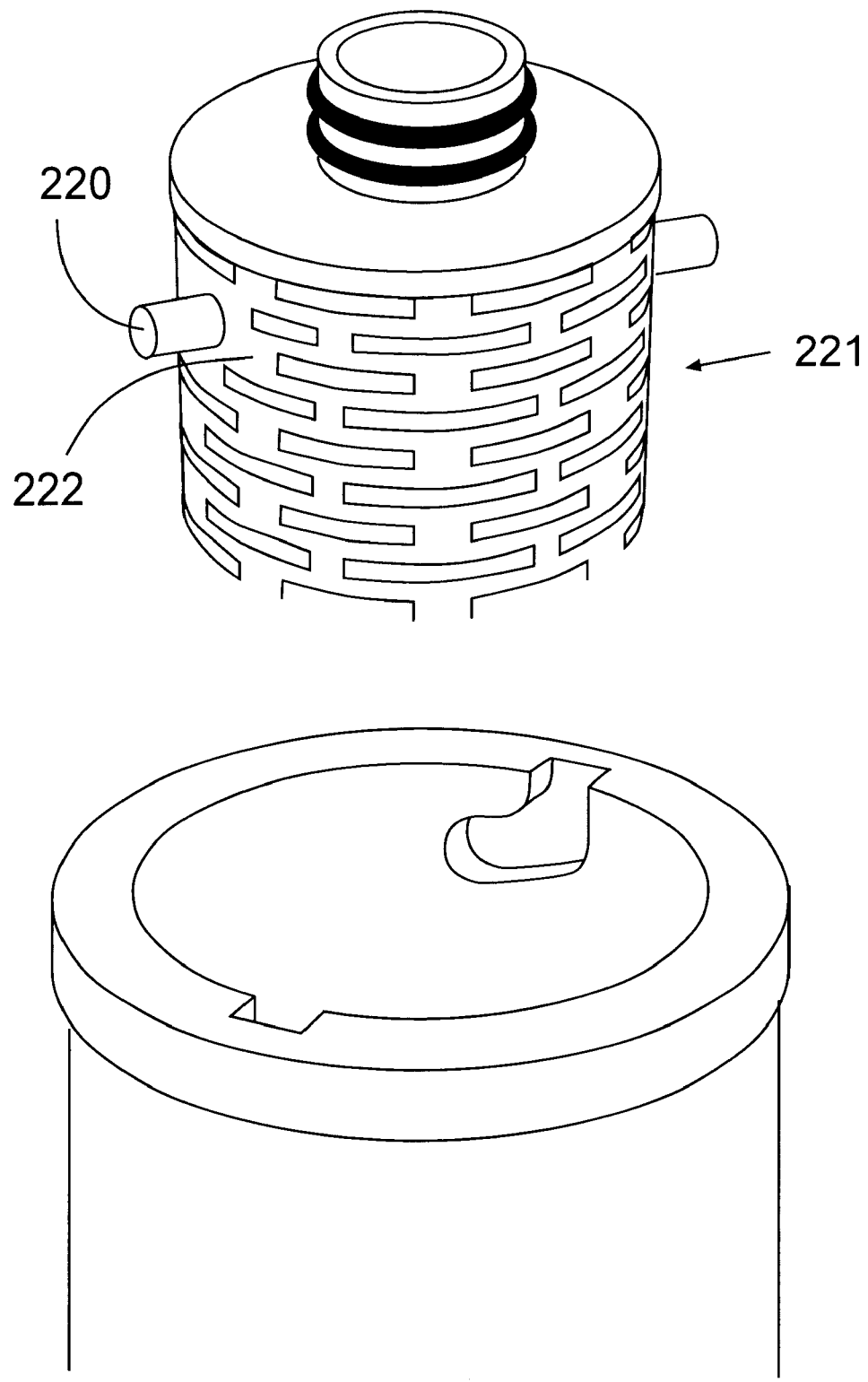
FIG. 31 is a planar view of an additional embodiment of the present invention.
Figure 32A:
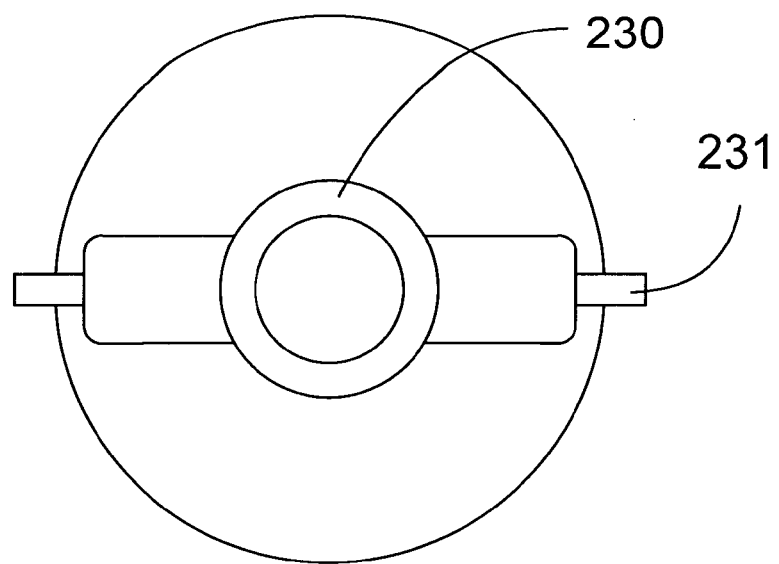
FIG. 32a is a planar, top down view of a further embodiment of the present invention.
Figure 32B:
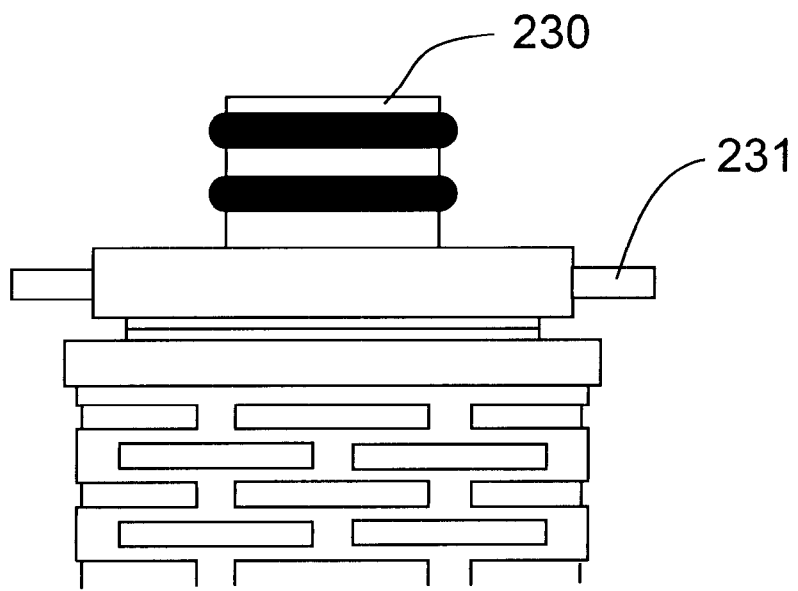
FIG. 32b is a planar, side view of the embodiment of FIG. 32a of the present invention.

In a further embodiment, the attachment devices used to secure the cartridge to the housing, whether they be lugs, bayonets or wings or any other design, may be mounted to any portion of the cartridge. As shown in most of the embodiments of the present invention, the flanges and attachment devices are mounted to the end cap of the cartridge. Alternatively, the attachment devices 220 may be formed on the body of the cartridge 221 itself such as the sleeve portion 222 of FIG. 31 or the attachment devices 231 may be formed on or attached to the cartridge adaptor 230 of FIGS. 25a and 25b.

The selection of filtration media used within the filtration cartridge can be any of those commonly used in the industry. Typically, the media includes but is not limited to of flat sheet membrane, spiral wound flat sheet membrane, pleated flat sheet membrane, spiral pleated flat sheet membrane, hollow fiber membrane, depth filter media such as spiral wound continuous fiber depth filter media, sintered metal filter media, ceramic media, particulate media containing an active capture material such as resin or ceramic beads or a membrane with ligands for removing selected materials from the fluid attached to their surfaces, ion exchange media such as anion resin, cation resin or mixtures of the two alone or incorporated into a membrane structure and combinations of any of these.

This media may be formed of any material typically used in filtration such as paper, other cellulosic materials such as regenerated celluloseor nitrocellulose, glass fiber and fabric, metal such as stainless steel, nickel, chromium and alloys and blends thereof, ceramics, plastics, preferably thermoplastic materials such as polyolefins, homopolymers, copolymers or terpolymers, including polyethylene such as ultrahigh molecular weight polyethylene, polypropylene and the like, PVDF, PTFE resin, PFA, ECTFE and other fluorinated resins, particularly perfluorinated thermoplastic resins, PVC, nylons, polyamides, polysulphones, modified polysulphones such as polyethersulphones, polyarylsulphones and polyphenylsulphones, polyimides, polycarbonates, PET and the like.

Lastly, in all of these embodiments the bowl and manifold may be made of a plastic, preferably a thermoplastic including polyolefins such as polyethylene, ultrahigh molecular weight polyethylene or polypropylene, copolymers or terpolymers of polyolefins, nylons, PTFE resin, PFA, PVDF, ECTFE and other fluorinated resins, particularly perfluorinated thermoplastic resins, polycarbonates, polysulphones, modified polysulphones such as polyethersulphone, polyarylsulphones or polyphenylsulphones, any glass or other reinforced plastic or a metal such as stainless steel, aluminum, copper, bronze, brass, nickel, chromium or titanium or alloys or blends thereof.

What is claimed:

1. A filter housing comprising a manifold and a bowl having a vertical axis, the manifold having a series of threads formed on its outer surface, the bowl having a ring with threads on its inner surface which mate with the threads of the manifold, the ring being rotatable with respect to the bowl and being secured to the bowl so as to maintain a substantially fixed position on the vertical axis of the bowl and a filter cartridge contained within the bowl, said filter cartridge being positively interlocked with the bowl so that said filter cartridge travels with the bowl into said manifold or from said manifold when said ring is rotated.

2. A filter housing comprising a manifold having a vertical axis and a bowl, the bowl having a series of threads formed on its outer surface, the manifold having a ring with threads on its inner surface which mate with the threads of the bowl, the ring being rotatable with respect to the manifold and being secured to the manifold so as to maintain a substantially fixed position on the vertical axis of the manifold and a filter cartridge contained within the bowl, said filter cartridge being positively interlocked with the bowl so that said filter cartridge travels with the bowl into said manifold or from said manifold when said ring is rotated.

3. The housing of claim 1 wherein the ring is secured to the bowl via a keyway and a key formed on the inner surface of the ring and mounted within the keyway of the bowl.

4. The housing of claim 2 wherein the ring is secured to the manifold via a keyway and a key formed on the inner surface of the ring and mounted within the keyway of the manifold.

5. The housing of claim 1 wherein the ring is secured to the bowl via a ridge formed below the ring on the outer surface of the bowl.

6. The housing of claim 2 wherein the ring is secured to the manifold via a ridge formed above the ring on the outer surface of the manifold.

7. The housing of any one of claims 1 or 2 wherein the ring is secured via a snap ring secured to the surface of the component to which the ring is attached.

8. The housing of any one of claims 1 or 2 wherein the ring drives the housing and manifold together and apart as the threads are rotated in an appropriate direction relative the threads of the component which has threads mounted upon it.

9. The housing of any one of claims 1 or 2 wherein the housing, ring and manifold are formed of a material selected form the group consisting of metal and plastic.

10. The housing of any one of claims 1 or 2 wherein the housing, ring and manifold are formed of a metal selected from the group consisting of stainless steel aluminum, copper, bronze, brass, chromium, titanium, alloys and blends thereof.

11. The housing of any one of claims 1 or 2 wherein the housing, ring and manifold are formed of a plastic selected from the group consisting of PTFE resin, PFA, PVDF, ECTFE, fluorinated polymers and copolymers, perfluorinated thermoplastic polymers and copolymers, polyolefin homopolymers, copolymers and terpolymers, ultrahigh molecular weight polyethylene, metallocene derived polymers, PVC, nylons, polysulphones, polyethersulphones, polyarylsulphones, polyphenylsulphones, polycarbonates, polyamides, polyimides and blends thereof.

* * * * *